US008675285B2

(12) United States Patent
Obrebski

(10) Patent No.: US 8,675,285 B2
(45) Date of Patent: Mar. 18, 2014

(54) CHANGER FOR OPTICAL ELEMENTS

(76) Inventor: Andreas Obrebski, Dusseldorf (DE)

( * ) Notice: Subject to any disclaimer, the term of this patent is extended or adjusted under 35 U.S.C. 154(b) by 139 days.

(21) Appl. No.: 13/214,658

(22) Filed: Aug. 22, 2011

(65) Prior Publication Data

US 2011/0299174 A1 Dec. 8, 2011

Related U.S. Application Data

(63) Continuation of application No. PCT/DE2010/000215, filed on Feb. 19, 2010.

(30) Foreign Application Priority Data

Feb. 23, 2009 (DE) .......................... 10 2009 011 681

(51) Int. Cl.
G02B 15/02 (2006.01)

(52) U.S. Cl.
USPC .......................................... 359/672

(58) Field of Classification Search
USPC ......... 359/676, 694, 739–741, 889, 351, 381, 359/634, 361, 672–675; 351/217
See application file for complete search history.

(56) References Cited

U.S. PATENT DOCUMENTS

| | | | |
|---|---|---|---|
| 2,399,658 A | 5/1946 | Ellsworth | |
| 3,255,666 A | 6/1966 | Davis et al. | |
| 4,600,976 A | 7/1986 | Callahan | |
| 6,414,805 B1 | 7/2002 | Reichman et al. | |
| 2005/0117208 A1* | 6/2005 | Schnitzler et al. | 359/381 |
| 2012/0007888 A1* | 1/2012 | Maiorova | 345/634 |

FOREIGN PATENT DOCUMENTS

| | | |
|---|---|---|
| DE | 2254718 A1 | 5/1974 |
| DE | 7821689 U1 | 11/1978 |
| DE | 19702754 A1 | 7/1998 |
| DE | 19702967 A1 | 7/1998 |
| DE | 19832973 A1 | 1/2000 |
| DE | 19835070 A1 | 2/2000 |
| DE | 10312644 A1 | 9/2004 |
| DE | 10336890 A1 | 3/2005 |
| DE | 102006004232 A1 | 8/2007 |
| DE | 102006006014 A1 | 9/2007 |
| EP | 0248974 A2 | 12/1987 |
| WO | 2010094279 A2 | 8/2010 |

OTHER PUBLICATIONS

International Search Report for PCT Application No. DE2010/000215 dated Nov. 5, 2010, with English translation thereof (11 pages).

* cited by examiner

Primary Examiner — Scott J Sugarman
Assistant Examiner — Mustak Choudhury
(74) Attorney, Agent, or Firm — Osha Liang LLP

(57) ABSTRACT

A changer includes an axis of rotation for at least one optical element for at least one optical path comprising an optical axis. The changer inserts the optical element into the optical path by a rotary motion or removes it from the optical path. The optical path is one of at least two spatially connected optical paths and the axis of rotation of the changer is located between two parallel lines. The parallel lines run in a plane through the interfaces of the optical axes of the optical paths with one plane, which intersects the optical axes under the same angles and is perpendicular to the plane, which is spanned by the optical axes. The parallel lines are perpendicular to the connecting line between the two interfaces of the optical axes of the optical paths with the one plane, which intersects the optical axes under the same angles.

13 Claims, 12 Drawing Sheets

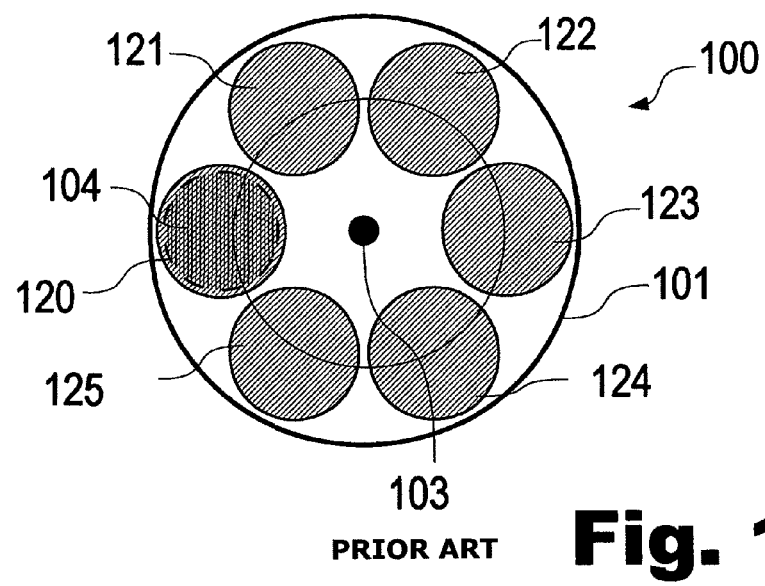
Fig. 1
PRIOR ART
Fig. 2
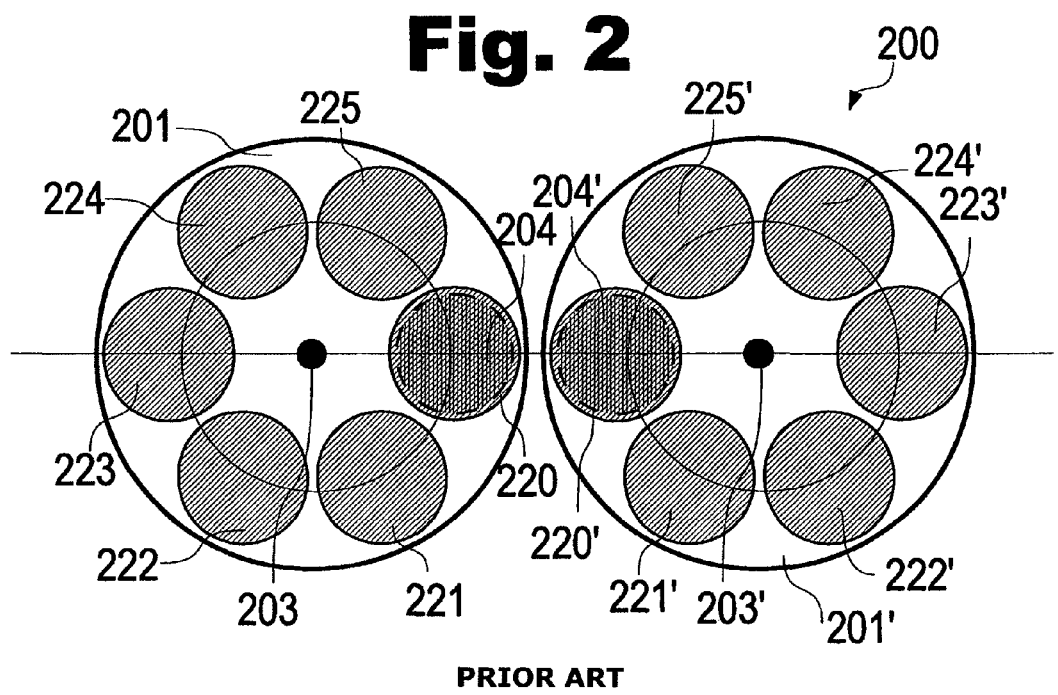
PRIOR ART

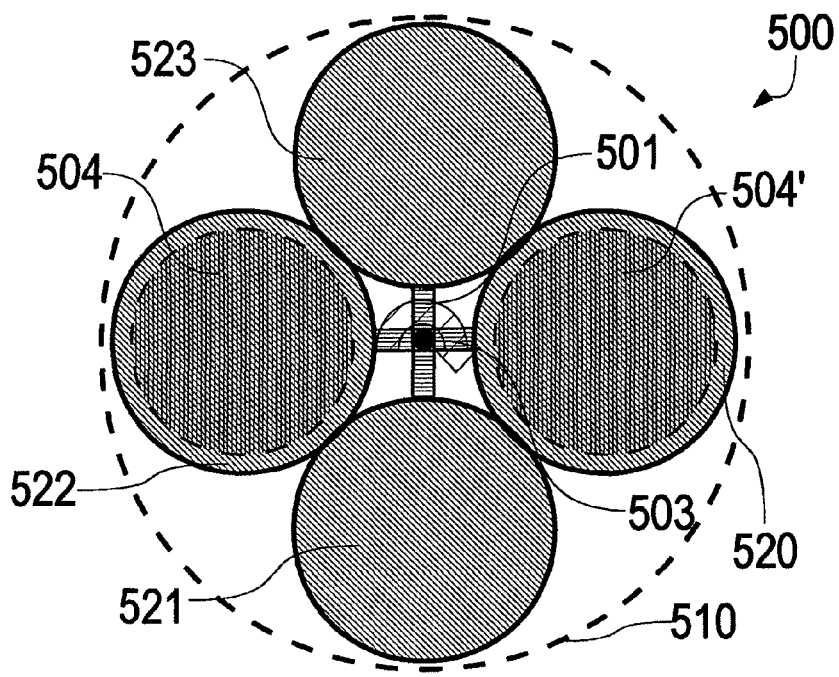
Fig. 5
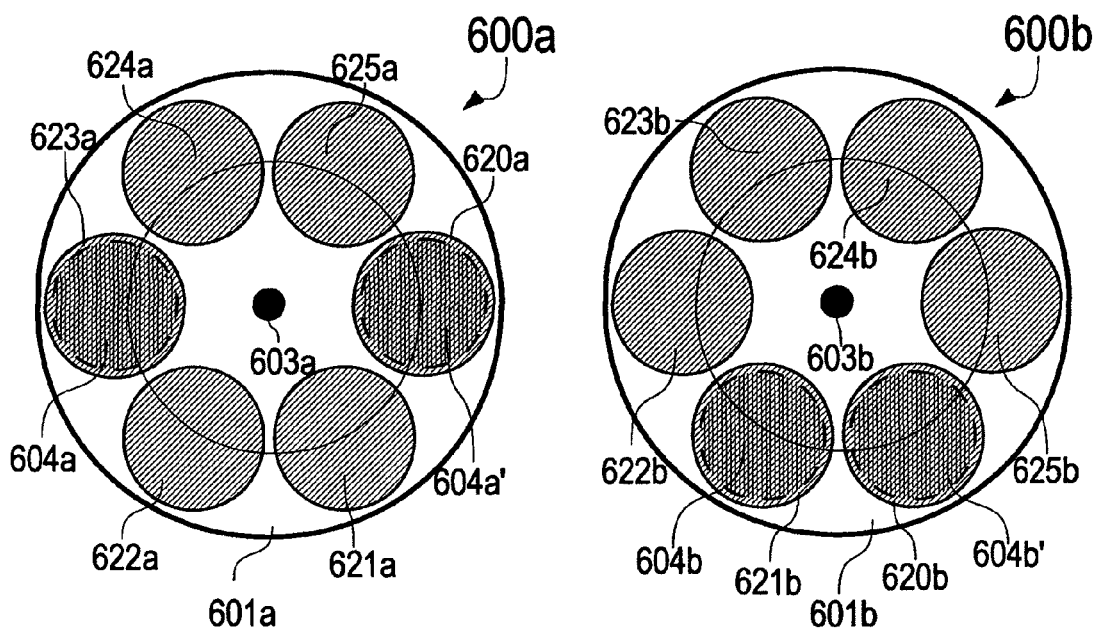
Fig. 6a  Fig. 6b

CHANGER FOR OPTICAL ELEMENTS

CROSS-REFERENCE TO RELATED APPLICATIONS

This application is a continuation of PCT Application No. PCT/DE2010/000215, filed Feb. 19, 2010, which claims priority of German Patent Application No. 10 2009 011 681.8, filed in Germany on Feb. 23, 2009, the entireties of which are incorporated by reference herein.

BACKGROUND OF INVENTION

1. Field of the Disclosure

The invention relates to a changer for optical elements and to an optical device, in particular a surgical microscope, a stereo microscope, a microscope, an endoscope or a stereo endoscope, containing such a changer.

2. Description of the Related Art

Changers for optical elements have already been well known. For example, DE 78 21 689 U1, DE 22 54 718 and DE 103 12 644 know a filter wheel as a rotatable, circular changer for an optical path. DE 103 12 644 thus introduces a possibility for equipping the filter wheel laterally in a simple manner.

It is already known from EP 0248 974, DE 198 35 070 and DE 103 36 890 to displace by rotation relative to one another in a single optical path two consecutively arranged changers, each changer comprising a set of filters, so as to attain a large number of different combinations.

The attempt of lightweight construction by means of recesses in the support of the optical elements is also known from EP 0248 974.

The giant disadvantage of all of these solutions is the large lateral space requirement, which can even be more than one order of magnitude above the dimensions of the cross section of the optical path, which is to be influenced.

The mere approach of the multi-changer from U.S. Pat. No. 4,600,976 with a slightly smaller, but still considerable space requirement on the side, thus perpendicular to the optical path, than in the above-mentioned documents, is interesting. However, this multi-changer is still quite large and is substantially expanded along the optical path, thus parallel to it. The elements can be pivoted in easily, but they must be mechanically controlled individually, which is already complicated. The introduction of the optical elements into the optical path takes place by means of a rotary motion.

The mere approach of DE 198 32 973 comprising a similar filter magazine as in U.S. Pat. No. 4,600,976 is also interesting because of the large possible number of optical elements, which can be introduced. However, the insertion and removal of the optical elements takes place by means of a linear motion with the help of an electromagnet. The arrangement cannot be controlled easily, it is still large and slow, energy-consuming and developmentally extensive.

U.S. Pat. No. 3,255,666 comes close to DE 198 32 973, but with manual filter insertion instead of by means of an electromagnet. DE 197 02 967, which describes a fully-automatic filter exchange, also comes close, with the filters being particle filters.

DE 197 02 754 furthermore describes a possibility for changing filters, without removing the filter wheel from the device.

Stereo optical paths or two or more spatially connected optical paths, respectively, each having a filter wheel in each case for a single optical path, can be found in DE 10 2006 006 014, DE 10 2006 004 232 and DE 103 36 890.

The disclosure of the documents cited in this application is fully adopted herewith by reference.

The disadvantage of the changers, which are offered by the state of the art, is that the optical elements, which are to be pivoted in, are arranged perpendicular to the optical path and outside of the already available space, not only in the active position, thus pivoted into the optical path, but also in the non-active position, outside of the optical path. However, due to the fact that the shape of the optical devices follows the optical path in most cases, the non-active optical elements project from the original arrangement, take up a lot of space, interfere with the orientating view past the device to the object space/operating space and the access to the object space/operating space and cause an additional housing volume and surface and thus also an additional weight, which cannot not be neglected. In addition to the direct component, this additional weight also has an indirect component due to the additional effort in response to actuation and counterweight in the case of movable optical devices, such as surgical microscopes. In general, the additional weight and volume is highly disadvantageous in the case of all optical devices, in particular from the consumer sector, such as cameras or webcams, e.g.

Additional space must be reserved for the changers according to the state of the art, because typically, there is no excess space, which could be used for optical elements in a non-active position, in the case of optical paths, which are operated individually by means of the changers.

Such solutions are particularly troublesome or cannot be accepted at all, respectively, in the endoscopes or surgical microscopes. An endoscope would have to multiply its cross section or would lose a considerable amount of resolution by means of the constriction of the optical path. In the case of a surgical microscope, a filter wheel blocks the orientating view past the microscope (see, e.g. DE 103 36 890, paragraph [0012]) and prevents a simple original positioning of the surgical microscope and of the surgeon's hands as well as a rough orientation during the operation. Due to the fact that the original positioning as well as the orientation must oftentimes be established several times during an operation, a surgical microscope comprising changers according to the state of the art is not very ergonomic. The solution proposed in DE 103 36 890 of arranging the changer closer to the top in the optical path does not keep the physician from straining his neck any less or to maintain the optical ergonomic operating position. This proposal is not a sustainable solution for the problem.

Large changer wheels are slow, require large torques and some expenditure of energy, so as to be moved and positioned. The linear (filter) inserting devices are also long, slow and cannot be moved in a low-energy manner.

The automatic filter magazines known from DE 198 32 973 and DE 197 02 967 offer an advantage in response to the use of many filters. In the case of two to six filters, as required in the case of the surgical microscopes, however, they represent a technical overkill, while still requiring too much space.

SUMMARY OF INVENTION

According to one or more embodiments, a changer includes an axis of rotation for at least one optical element for at least one optical path comprising an optical axis, wherein this changer inserts the at least one optical element into this at least one optical path by means of a rotary motion or removes it from this optical path. The charger is characterized in that this at least one optical path is one of at least two spatially connected optical paths and that the axis of rotation of the changer is located between two parallel lines, wherein these parallel lines run in the plane through the interfaces of the optical axes of the optical paths with one plane, which intersects these optical axes under the same angles and is thereby perpendicular to the plane, which is spanned by the optical axes and wherein these parallel lines are perpendicular to the connecting line between the two interfaces of the optical axes of the optical paths with the one plane, which intersects these optical axes under the same angles.

In another aspect, a method to tune a changer for magnification including two partial changers is disclosed. The method provides that a first partial changer is held in a position with a first optical element in the optical path, while the second partial changer assumes all of its possible positions consecutively in each case with a different optical element in the optical path. Subsequently, the first partial changer assumes its next position with a next optical element in the optical path and the second partial changer then again assumes its possible positions consecutively.

In another aspect, a changer for magnification comprising an axis of rotation, at least two optical elements, whereas each optical element encompasses optical power, whereas optical elements can be pivoted into an optical beam path having an optical axis, whereas the optical axis of the beam path at the spot where the optical elements can be pivoted into the beam path and the axis of rotation of the changer are at an angle different from 0° and 90°.

Other aspects and advantages of the invention will be apparent from the following description and the appended claims.

BRIEF DESCRIPTION OF DRAWINGS

FIG. 1 shows a filter wheel for a mono optical path as state of the art.

FIG. 2 shows two filter wheels for a stereo optical path as state of the art.

FIG. 3 shows a one-filter changer for a stereo optical path. View from the top in or opposite to the direction of the optical paths. FIG. 3(a) shows when pivoted out and FIG. 3(b) shows when pivoted in.

FIG. 4 shows a two-filter changer for a stereo optical path. View from the top in or opposite to the direction of the optical paths. FIG. 4(b) shows when pivoted in.

FIG. 5 shows a four-filter changer for a stereo optical path. View from the top in or opposite to the direction of the optical paths.

FIG. 6 shows a six-filter changer for a stereo optical path with a different selection of the optical paths. FIG. 6(a) shows with two filters between the optical paths, FIG. 6(b) shows no filter between the optical paths.

FIG. 7 shows an exemplary arrangement of changers in optical paths of optical devices. View from the side, perpendicular to the direction of the optical paths.

FIG. 8 shows a non-planar changer in an optical path. FIG. 9 shows a changer with lenses in different positions in the optical path.

DETAILED DESCRIPTION

Figure 3A:
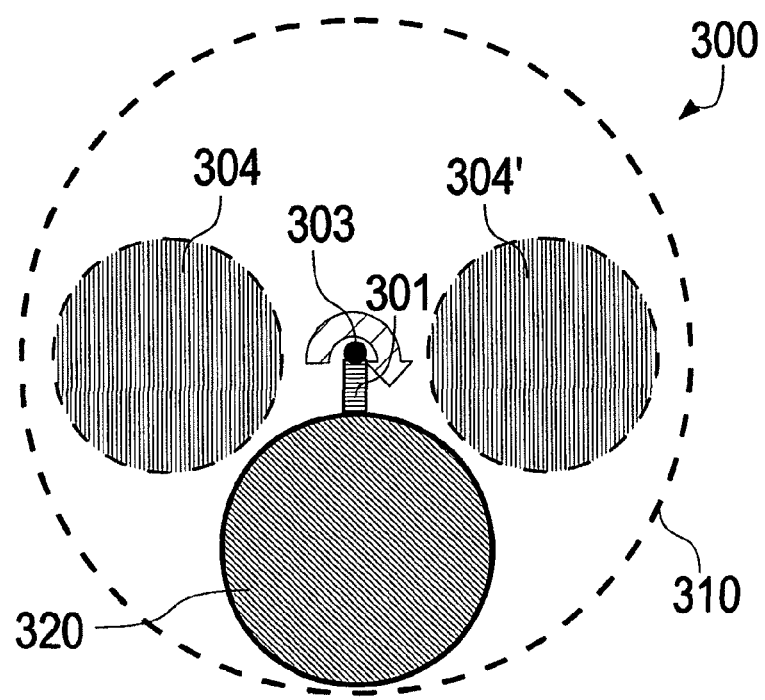

It is thus an object of this invention to provide for a changer for optical elements, which brings optical elements, such as filters, diaphragms, lenses, splits, mirrors, DOEs and simple optical gratings, beam splitters, attenuators, etc. into the optical path or removes them from this optical path, and which does not encompass the above-mentioned disadvantages and which in particular saves space and weight, which does not block the view, which can thereby be produced easily, is light, smooth-running and easy to operate.

The motivation for the increasing use of changers is the demand for an increased multi-functionality of optical devices. In the case of surgical microscopes and endoscopes, these are, of late, e.g. the versatile fluorescence applications, which increasingly establish themselves as imaging techniques in the case of surgeries, for instance the use of ALA5 for the detection of glioblastomas, a very dangerous type of brain tumor, or of ICG for the presentation of aneurisms. However, the use of green filters, e.g., has been practiced for some time in the ENT field for the purpose of a contrast increase. In the case of the fluorescence applications, new fluorescent dyes are developed continuously, so that filters with ever-evolving characteristics are needed. Even if the selection of the filters is limited to the most well-established surgeries, some filters must nonetheless be provided and it must be ensured that a switchover between different observation and illuminating modes can be made quickly and reliably. This includes the insertion into, but also the removal of the filters from the optical path. A further reason for the high demand of economical changers is the demand for a relatively large amount of magnification stages with a large magnification range at an acceptable price in optical devices, which cannot be satisfied with today's Galilei changer and zoom systems. Today's Galilei changers have a maximum of five magnification stages, are slow, large and cumbersome. In contrast, the zooms are expensive, developmentally extensive and have only a very small magnification range. They are thereby also large, cumbersome and production is extensive.

According to the instant invention, the changer has an axis of rotation and at least one optical element for at least one optical path comprising an optical axis, wherein this changer introduces the at least one optical element into this at least one optical path by means of a rotary motion or at least with the participation of a rotary motion or removes it from this optical path. This at least one optical path is thereby preferably one of at least two spatially connected optical paths. According to the invention, the axis of rotation of the changer is located between two parallel lines, wherein these parallel lines run through the interfaces of the optical axes of the optical paths with one plane, which intersects these optical axes under the same angles and is thereby perpendicular to the plane, which is spanned by the optical axes. They run precisely in this plane and are oriented perpendicular on the connecting line between the two interfaces of the optical axes of the optical paths with the one plane, which intersects these optical axes under the same angles. These angles can be 90°, e.g. (see, e.g., FIG. 7a and 7b) or 45° (see, e.g. FIG. 7c). The case of 90° applies herein for two parallel optical paths, 45° applies for optical paths, which are perpendicular to one another. The parallel optical paths can form a stereo optical path, but they can also be two sections of the same optical path.

The solutions from the state of the art have axes of rotation outside of the area according to the invention.

Preferably, the axis of rotation of the changer can have the same distance to the optical axes of the optical paths.

The at least one optical element can be introduced into each of the at least two spatially connected optical paths. In the non-active position, when pivoted out, it is mostly located within the housing, at locations, which provide space anyhow due to the standard design, because even though the optical element has a considerable surface, it does not have a considerable volume.

At least one of the at least two spatially connected optical paths can be an observation optical path, but likewise also an illuminating optical path.

According to a further embodiment, the axis of rotation of the changer can be inclined against the optical axis of the optical path at an angle, wherein the changer only operates one optical path. In the event that the changer pivots a beam splitter, the axis of rotation of the changer is preferably inclined at substantially a/2 when the beam splitter is inclined against the optical path at the angle α. However, in the event that the changer pivots in other optical elements, the axis of rotation of the changer is preferably inclined against the optical path by substantially 45°. The optical element, which is pivoted in, intersects the optical path at an angle of between 50° and 140° and in response to the rotation of the changer by 360°, it forms an angle of between −40° and +40° with the optical axis of the optical path in at least one position. Preferably, the optical element, which is pivoted in, intersects the optical path at an angle of between 70° and 110°, more preferably at an angle of between 80° and 100°, optimally substantially at an angle of 90° and, in response to the rotation of the changer by 360°, it preferably forms an angle of between −30° and 30, more preferably between −10° and 10°, optimally substantially an angle of 0° with the optical axis of the optical path in at least one position. Substantially when pivoted out, in the non-active position, the optical element thus assumes space along the optical path, which is already available and which thus does not widen the device unnecessarily.

Provision is preferably made for a possibility to replace the at least one optical element itself or a rider, which supports this optical element, in a simple manner for a quick replacement of optical elements, namely without utilizing a tool. This can also take place automatically by means of a loading/unloading device. The possibility to replace the rotating part of the changer in a simple manner without using a tool would also be practical.

For the purpose of saving energy and for easy movability during operation, the rotating support can preferably at least partially be made of light material, e.g. light metal, plastic, light ceramics or carbon fibers. Likewise, the rotating support can be provided with recesses, so as to save weight.

To be able to fully use the optical path, the optical elements should be larger than the optical path.

To be able to use all of the available fluorescent dyes, if possible, the optical components, in particular the optical elements, which can be pivoted in, are to use the adequate spectral range and are to be designed for the visible and/or UV and/or IR spectral range and/or for a partial range thereof, if necessary.

Preferably, the optical ergonomics will be guaranteed by means of a low-vibration and low-shock mechanical system.

The optical elements, which are operated in transmission, will preferably be at least partially anti-reflective coated. To avoid internal reflexes, the surfaces of the non-optical parts are preferably at least partially blackened and/or matted and/or are covered with light-absorbing layers and/or materials.

The optical elements, which can be pivoted in, preferably include lenses, mirrors, filters, DOEs (Diffractive Optical Element), simple optical gratings, beam splitters or diaphragms. The diaphragms can be slit, screen, round, square or hole diaphragms or diaphragms, which are designed in a different manner; the filters can be interference, edge, color or band filters or band elimination filters or ND (neutral density) filters. Preferably, the filters can also be suitable for fluorescence excitation or fluorescence observation, in particular of the fluorescent dyes ALA5 or ICG. ALA5 can be used for the intra-operative illustration of glioblastomas or other cancerous tissue, ICG can be used for the intra-operative illustration of aneurysms. Further filters can also be used for identifying and/or treating diseased tissue.

On the other hand, the transmission characteristics of the optical elements for spectrally neutral applications in the used spectral range are to deviate from a spectrally independent characteristic by less than 25%, preferably less than 10%, more preferably less than 5%.

Changers, which act as a replacement of and as an improvement for the Galilei magnification changers, are to include two sets of lenses, wherein the lenses fulfill the condition $d_{ij}=|f_i+f_j|$, preferably for all i and j, wherein d is the distance of the lenses from one another in the pivoted state of the optical path, f is the focal length of the lens, i is the index for the lenses of a first lens set and j is the index for the lenses of a second lens set. It goes without saying that these lenses can also be introduced into the optical path by means of a translatory motion. Preferably, these changers are characterized in that half of the foci of all of the lenses in the optical path substantially coincide in one point. Both lens sets can include the same number of lenses, this number is preferably 2, 3, 4 or 5. However, it can also include a different number of lenses. It must be clarified here that every time this document mentions a lens, this does not only refer to the individual lens, but also to cemented elements, lens doublets and triplets or also to lens system, in which lenses are arranged at a distance. The resulting positive or negative refractive power is crucial. The principal planes of the lenses can thus at least partially easily lie outside of the lenses, which is particularly simple when the "lens" is a lens system, e.g. inspired by the telefocus or retrofocus object lens. It can be attained through this that the lenses of a lens set are located closer together than the corresponding main planes, when viewed in beam direction.

A changer can consist of a plurality of partial changers and one set of lenses can in each case be accommodated in a partial changer in each case, e.g.

For logical reasons, the lenses are preferably corrected with reference to optical aberrations. The optical correction can result with the use of DOEs, cemented elements, lens duplets and triplets or lens systems, in which lenses are arranged at a distance.

To equip the novel Galilei changer with a continuously variable magnification, this changer is preferably expanded by at least one lens having a variable refractive power. This at least one lens having a variable refractive power can replace a lens set in the changer, when it or another lens is arranged so as to be movable along the optical path or can form a zoom, if arranged so as to be movable or stationary, but in the latter case together with at least another lens having a variable refractive power. In the case of the zoom comprising two stationary lenses having a variable refractive power or in the case of optical correction of a lens having a variable refractive power by means of another one, the at least two lenses having a variable refractive power are controlled in the opposite direction; when the refractive power of a lens is increased, the refractive power of the other lens is decreased and vice versa. It results from this that at least one optical aberration, which results from the combination of the at least two lenses having a variable refractive power, is smaller than the sum of the same optical aberrations of the individual lenses and even smaller than the same optical aberration of each of the lenses having a variable refractive power individually.

Preferably, the zoom range of the zoom comprising the lenses having a variable refractive power covers at least the respective area between the adjacent magnification stages of the changer.

The lenses having a variable refractive power can include a liquid and/or a liquid crystal and/or a polymer and/or an electropolymer and/or two or more liquids and/or can operate according to the electrowetting principle. The latter encompass particularly good correcting characteristics when they encompass two optically active interfaces.

In the event that a changer consists of a plurality of partial changers, they are preferably not rigidly connected to one another. They can indeed be coupled to one another at least partially or temporarily, and can encompass different speeds in response to tuning. For instance, the one speed can be an integral multiple of the other speed.

In the case of a changer consisting of two partial changers, the tuning via the elements can be as follows: first, a partial changer is held in a position with a first optical element in the optical path, while the other partial changer assumes all of its possible positions consecutively (in each case with a different optical element in the optical path). Subsequently, the first partial changer assumes its next position with a next optical element in the optical path and the other partial changer then again assumes all of its possible positions consecutively.

In the case of a changer consisting of two partial changers and a zoom of lenses having a variable refractive power, the tuning via the elements can be as follows: first, both partial changers are held in a position in each case with an optical element in the optical path, while the zoom preferably passes its area in the periphery of an intermediate area between the individual magnifications of the partial changers. Subsequently, the first partial changer maintains its position, with the first optical element in the optical path and the other partial changer assumes its next position with a next optical element in the optical path. The zoom is set back and finally moves through its area. This is repeated until the second partial changer has assumed all of its possible positions consecutively. Then, the first partial changer assumes its next position and the tuning of the second partial changer and of the zoom starts from the beginning.

The changer according to the invention can be used in a surgical microscope, a stereo microscope, a microscope, an endoscope, a stereo endoscope, a head loupe, a head-worn microscope, a camera, a video camera, a webcam, a copier, a bio scanner, a barcode reader or a scanner.

Several preferred embodiments will be described in more detail by means of the attached drawings.

A filter wheel 100 is illustrated in FIG. 1 as a first example for the state of the art in the case of the changers for optical elements. The filter support 101 can be moved so as to rotate about the axis 103 and thereby inserts one of the filters 120, 121, 122, 123, 124 and 125 into the optical path 104 and/or removes the filter. In general, the filters 120, 121, 122, 123, 124 and 125 are different from one another. The filter 120 is located in the active position in the optical path 104, the filters 121, 122, 123, 124 and 125 are located outside of the optical path when in the non-active position. The number of filters on the support can differ considerably from the six filters, which are illustrated herein as an example, depending on the application.

With the double changer 200, FIG. 2 represents a further example for the state of the art. A stereo optical path or two spatially connected optical paths 204, 204' are in each case superimposed by one of the filters 220 and 200', or in each case from a selection of six filters 220, 221, 222, 223, 224, 225 and 220', 221', 222', 223', 224', 225', respectively, arranged respectively on the supports 201 and 201' of two filter wheels. The filters 220 and 220' are located in the optical paths 204 and 204' when in the active position or the filters 221, 222, 223, 224, 225 and 221', 222', 223', 224', 225' are located outside of the optical path when in the non-active position, respectively. The filter wheels are also arranged herein to be rotatable about the axes 203 and 203'. The large lateral space requirement of the arrangement, which exceeds the space requirement of the two stereo optical paths many times over, is immediately obvious. If one were to draw a connecting line between the interfaces of the optical axes of the optical paths 204 and 204' (these interfaces are in each case in the center of the optical paths 204 and 204', not illustrated in the drawing) and then draw two parallel lines through these interfaces perpendicular to this connecting line, the axes of rotation of the changers according to the state of art would clearly be located far outside the surface between the two parallel lines, which is claimed by the invention.

Figure 3B:
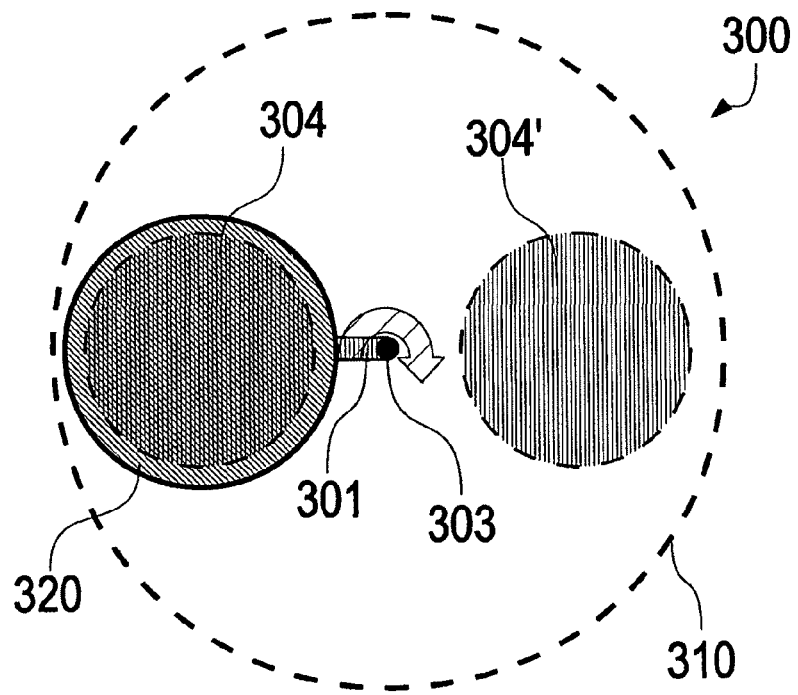

FIG. 3 represents a first embodiment 300 of a changer according to the invention. The mechanical support 301 for the optical elements, here a filter 320, turned out to be considerably smaller than in FIGS. 1 and 2. Other forms of the support are also possible. In any event, the support is to release the stereo optical paths or two spatially connected optical paths 304, 304', respectively, only in the pivoted out, non-active state of the filter. The support 301 and the filter 320 can be moved so as to be rotatable about the axis 303. FIG. 3*a* represents the arrangement with the filter 320 in the non-active state when pivoted out, FIG. 3*b* in the active state, pivoted into the optical path 304. The housing identified with 310 of the device, which includes the optical paths (e.g. a surgical microscope) aids to identify that the filter 320, in the non-active state, uses the lateral space, which is already available and which is predefined by the round housing form and which is also used for other device infrastructures, wherein the assumed volume, which is taken up, is extremely small. It is immediately clear that no space or only a minimum additional space must be reserved for the changer. The optical axes of the optical paths 304 and 304' are in each case located in the center thereof and are not illustrated explicitly.

FIG. 4 represents a further embodiment 400 of a changer according to the invention. The mechanical support 401 for the optical elements accommodates the two optical elements, here filters 420 and 420'. This arrangement, in turn, can be moved so as to be rotatable about the axis 403. FIG. 4a shows the arrangement in the non-active state when pivoted out. As can already be seen in FIG. 3a, the arrangement only takes up the excess space within the housing 410, which is already available. In FIG. 4b, the filters 420 and 420' were pivoted into the optical paths 404 and 404', respectively. The filters 420 and 420' can encompass the same, but also different characteristics. The same characteristics are obvious, but not absolutely necessary, when the optical paths 404 and 404' are a stereo optical path. In the event that the optical paths 404 and 404' are only two spatially connected optical paths, e.g. an observation and an illuminating optical path, different filter characteristics are obvious, albeit not absolutely necessary again. With the same argumentation as in the description of FIG. 3, it is immediately clear that no additional space has to be reserved for the changer. In the event that there is a further demand for filters, two or more such changers can be arranged on top of one another. They are then preferably controlled independent from one another and are pivoted into the optical paths individually or in groups.

The optical paths illustrated in FIGS. 3a, 3b, 4a and 4b could be stereo optical paths of a simple surgical microscope or of a microscope comprising a main observer and a 180° co-observer. Both could also apply and instead of filters, the changer would include beam splitters, which divide the optical paths for the main observer and the 180° co-observer. Without the co-observer, the main observer comprising the beam splitters of the changer, which are pivoted out, would have the full light intensity and thus possibly a better ergonomics or could operate with lower light intensity in response to the same visibility, which could prove to be particularly gentle for the patient. If necessary, however, the co-observer could be connected. However, it is also clear that the beam splitters would not be located flat in the rotational plane of the changer, but would be inclined against the rotational plane in most cases.

Figure 4A:
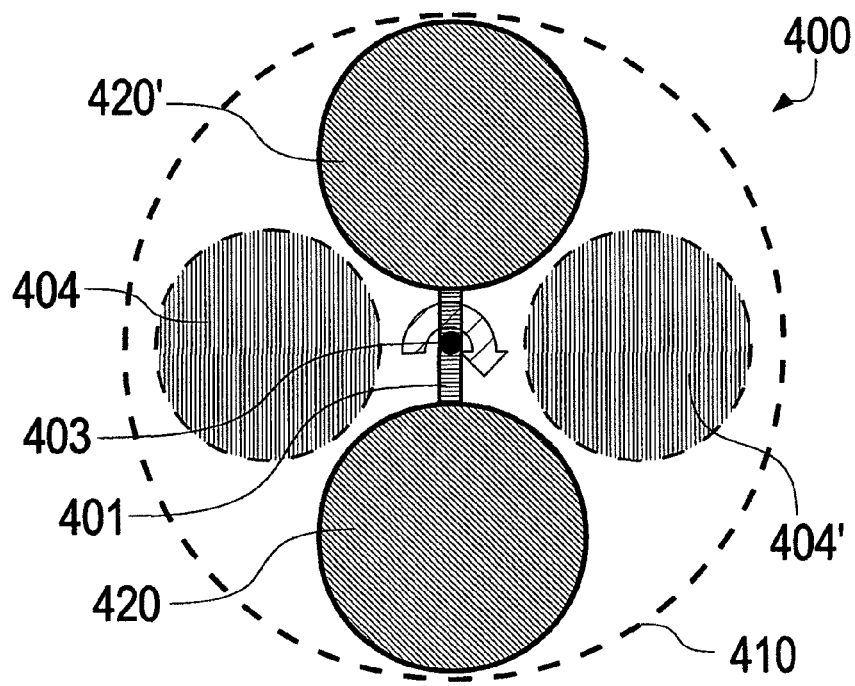
FIG. 4(a) shows when pivoted out.
Figure 4B:
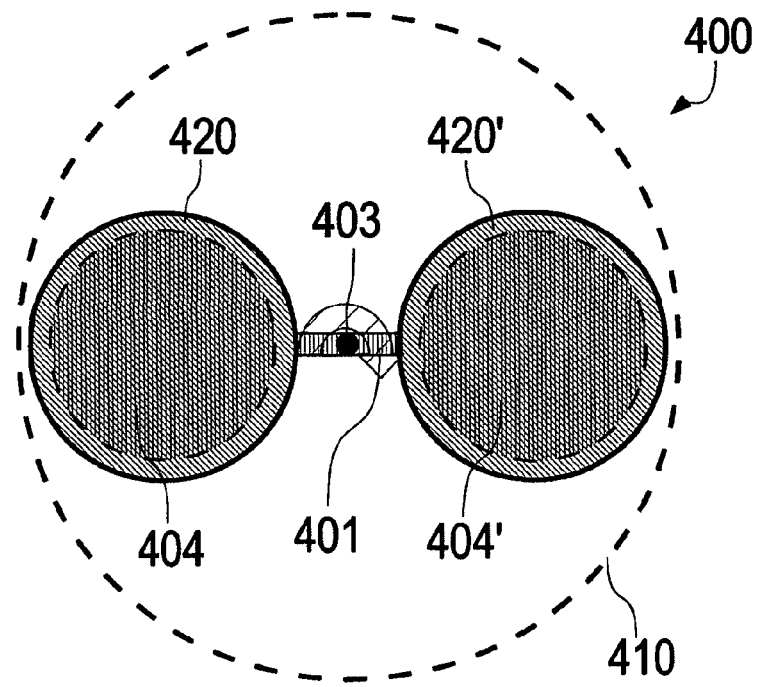
Figure 4C:
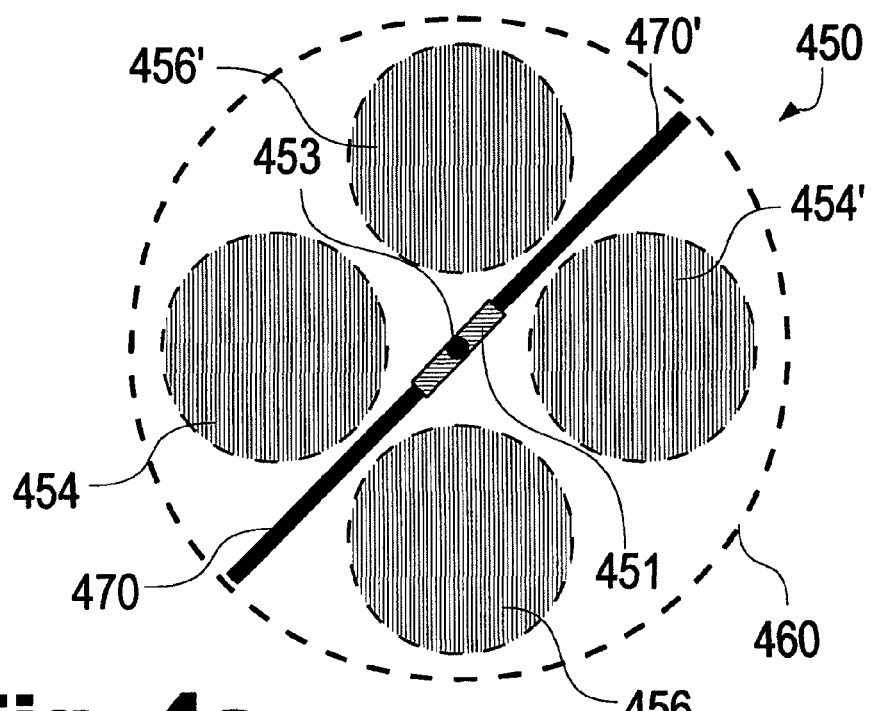
FIG. 4(c) shows when pivoted out in response to the presence of a 90° observer.
Figure 4D:
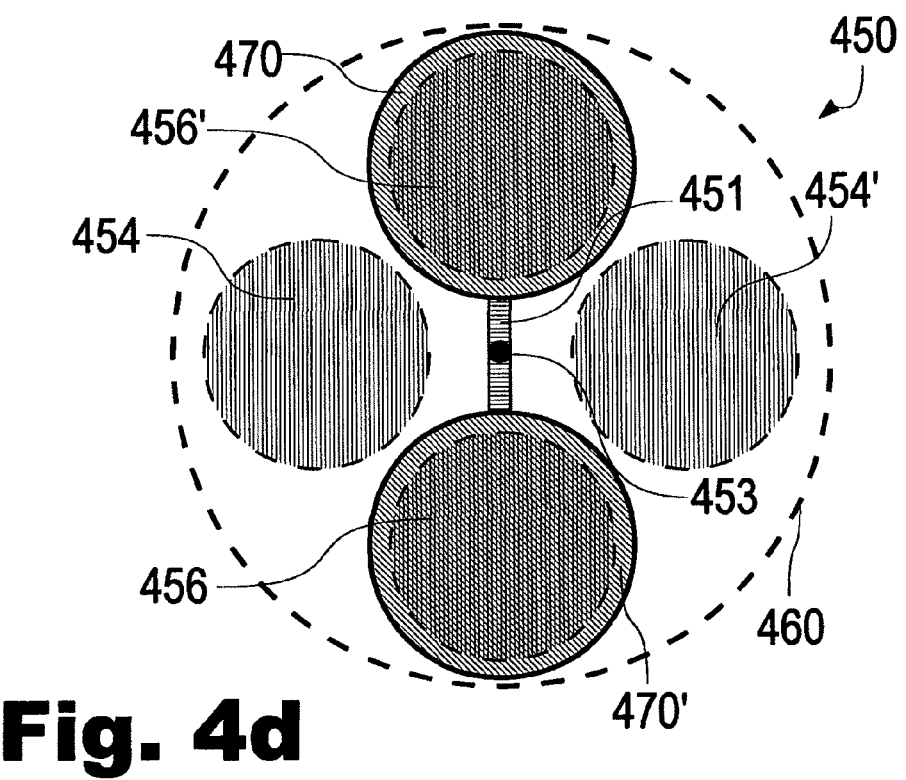
FIG. 4(d) shows when pivoted in in response to the presence of a 90° observer.

FIGS. 4c and 4d represent a further alternative of the embodiment 450 of a changer according to the invention. Here, two stereo optical paths or four spatially connected optical paths, or one stereo optical path and two spatially connected optical paths 454, 454', 456 and 456' are located within the housing 460 herein. This could be a surgical microscope comprising a main observer and a 90° co-observer (in the case of two stereo optical paths). In addition to the axis of rotation 453 for the entire changer, a further axis of rotation (not illustrated in FIG. 4c or 4d) is located in the support 451, e.g. The pivoting in motion of the optical elements does now not only consist of the rotation of the entire changer, but additionally of a part of the support 451 by 90° about this second axis, e.g. In the non-active position of the changer in FIG. 4c, the optical elements 470 and 470' are located outside of the optical paths, parallel to the optical paths and at the same time between the optical paths. The optical elements are illustrated as being pivoted into the optical paths with the result as in FIG. 4d due to the above-described double rotary motion. An additional similar changer arrangement at an angle of 90° to the support 451 would double the number of filters/optical elements. These arrangements could also be arranged on top of one another, e.g. at different locations within the total device along the optical path.

FIG. 5 represents a further embodiment 500 of a changer according to the invention. The mechanical support 501 for the optical elements accommodates the four optical elements, here filters 520, 520', 521 and 521'. This arrangement can again be rotated about the axis 503. The stereo optical paths or the two spatially connected optical paths 504, 504' are superimposed by two different pairs of optical elements 520, 520', 521 and 521' in response to the rotation of the changer 500, wherein 520 and 520' or 521 and 521', respectively, are the same or are superimposed by four preferably different optical elements 520, 520', 521 and 521'. The device could be a simple surgical microscope or a microscope comprising a main observer and a 180° co-observer, similar to the situation in FIGS. 3 and 4a and 4b.

The arrangements from FIGS. 3 to 5 according to the invention are arrangements with the axis of rotation in the center between the optical paths in response to a small distance between the optical paths. A distance between the optical paths is small when it is smaller than the expansion of the optical path. The distance between the next points of the respective optical paths must thereby be taken as the distance between the optical paths.

Figure 6C:
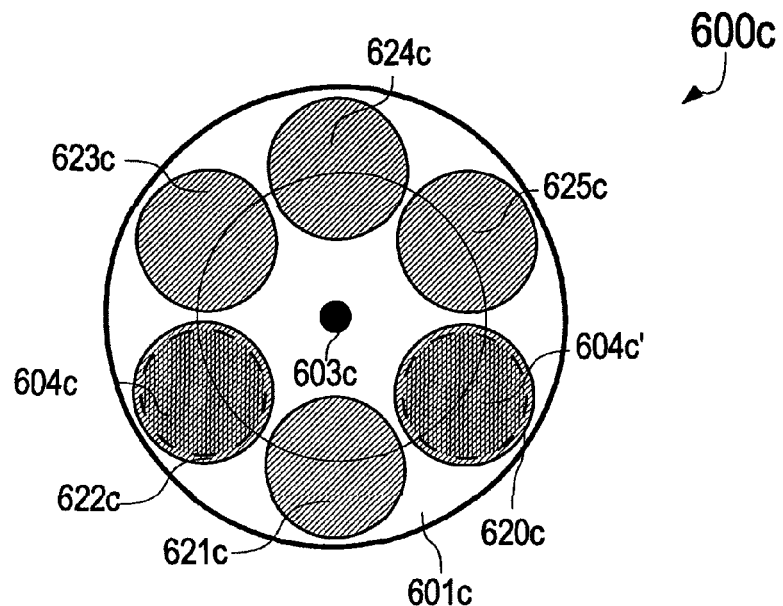
FIG. 6(c) shows with one filter between the optical paths. These views are from the top in the direction of or opposite to the direction of the optical paths.

FIG. 6 illustrates different relative arrangements between the optical paths of a stereo optical path or two spatially connected optical paths and the changer according to the invention with more than four (here six) optical elements in the changer in an exemplary manner. In FIG. 6a, the axis of rotation 603a is located in the center between the optical paths 604a and 604a' in response to a large distance between the optical paths. A distance between the optical paths is large when it is larger than the expansion of the optical path. The distance between the next points of the respective optical paths must thereby be taken as the distance between the optical paths. In FIGS. 6b and 6c, the axis of rotation 603b and 603, respectively, is not located in the center between the optical paths 604b and 604b' and 604c and 604c', respectively, but substantially outside of the connecting line of the optical axes (not illustrated) of the optical paths. The advantage of the arrangements in FIG. 6 as compared to those from FIGS. 3 to 5 is the larger number of the possible optical elements 620a to 625a, 620b to 625b or 620c to 625c in the changer. However, the fact that even though the changer is not necessarily located substantially outside of the already available inner volume of the device, but noticeably, is slightly disadvantageous. Two (FIG. 6a), no (FIG. 6b) and one (FIG. 6c) optical element of the changer is/are located between the optical paths of the stereo optical path or between the two spatially connected optical paths. The number of optical elements can also be different from six.

The distance of the optical paths and the number of the required optical elements in the changer can determine the chosen arrangement. Depending on the situation at hand, it can be particularly advantageous to choose a certain one of the arrangements, which is presented in FIGS. 3 to 6 or which is suggested in the description, in particular the arrangements comprising partial changers located on top of one another. All of these solutions are thereby already superior to the state of the art.

Figures 7A, 7B:
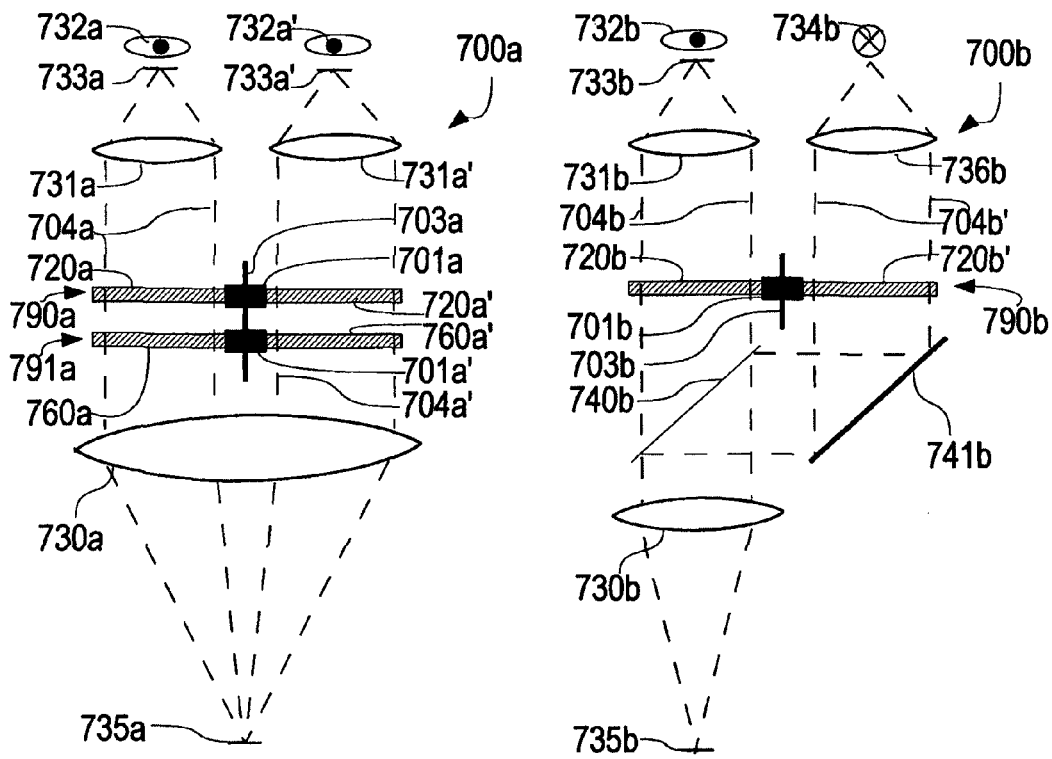
FIG. 7(a) shows two changers on top of one another in a stereo optical path, e.g. of a stereo microscope.
FIG. 7(b) shows one changer in two spatially connected optical paths, one illuminating and one observation optical path.

FIG. 7 presents several examples of the possible relative arrangement of at least one changer and the optical paths of the stereo optical path or of the two spatially connected optical paths, as they can occur in practice. A highly simplified illustration 700a of a stereo microscope, in particular of a surgical microscope, can be seen in FIG. 7a. The two changers 790a and 790a' are positioned on top of one another between the object lens 730a and the image-generating lenses 731a and 731a' within the two optical paths 704a and 704a' of the stereo optical path. The changers can have a common axis 703a, but are to be able to be moved independent from one another, at least partially. The changers influence the optical imaging of the object, which is arranged in the object plane 735a, as perceived or detected, respectively, by the eyes of the observer or by means of optical detectors 732a and 732a' in the image planes 733a and 733a'. Normally, surgical microscopes have many additional elements, which have not been illustrated herein for the sake of clarity, e.g. the eyepieces, which are required for the observation with the eyes. In the case of the detector 732a, it is positioned in the image plane 733a. In the case of an eye, the eye observes the image in the image plane 733a through an eyepiece (not in the picture) and is spaced apart from the image.

FIG. 7b shows an observation and an illuminating optical path of a microscope 700b as two spatially connected optical paths, which run parallel to one another across a certain distance. The changer is positioned within the optical paths, which run parallel. The optical path 704b is the observation optical path or an observation optical path of the microscope and the optical path 704b' is the illuminating optical path. Both optical paths are brought together by means of the beam splitter 740b, wherein the illuminating optical path is first deflected by 90° by means of the mirror 741b and run together between the beam splitter and the object plane 735b. The illumination takes place by means of the light source 734b, which is imaged through the lens 736b, the observation takes place through the imaging lens 731b with the eye or the electronic optics detector 732b. In the case of the detector 732b, said detector is positioned in the image plane 733b, in the case of the eye, the eye observes the image in the image plane 733b through an eyepiece (not in the image) and is spaced apart from the image.

FIG. 7c again shows two spatially connected optical paths. They run partially perpendicular to one another until they are brought together by the beam splitter 740c and then run together between the beam splitter and the object lens plane 735c. The optical path 704c is the observation optical path of a microscope (here illustrated as mono optical path) and the optical path 704c' is the illuminating optical path. The illumination takes place through the light source 734c, which is imaged through the lens 736c, the observation takes place through the imaging lens 731c by means of the eye or the electronic optic detector 732c. In the case of the detector 732c, it is positioned in the image plane 733c, in the case of the eye, the eye observes the image in the image plane 733c through an eyepiece (not in the image) and is spaced apart from the image. Here, the changer assumes a different form. Its axis 703c is located at an angle 45° to both optical paths 704c and 704c'. The optical elements 720c and 720c', illustrated as filters herein, also form an angle of 45° to the axis of rotation. In the active, pivoted in position, they are perpendicular to the respective associated optical paths, as is shown in the illustration. In response to a rotation by 90°, they leave the optical paths and do not influence them anymore (not illustrated). A changer comprising four optical elements is also possible. In such a case, the elements are replaced with two other elements in response to the rotation of the changer, in the event that the elements are evenly arranged on the changer. An equipping with even more elements is also possible, wherein a place holder can also count as an element. In such cases, the support for the optical elements must be larger, so as to guarantee sufficient distance between the elements.

Figure 7C:
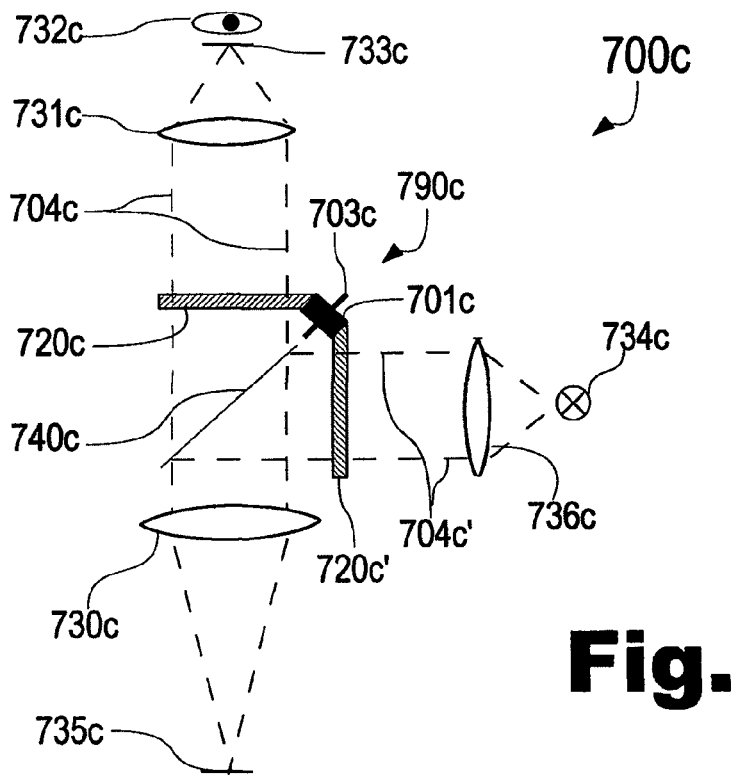
FIG. 7(c) shows a non-planar changer in two spatially connected optical paths.

FIG. 8 can be seen as an adaptation to FIG. 7c. In FIG. 8a, the same changer is present as in FIG. 7c. However, it only affects one optical path (804a). The changer can be rotated about the axis 803a. The axis 803a forms an angle of 45° with the optical path 804a. The optical elements, here the filters 820a and 820a' are assembled on the support 801a. The advantage can also be seen immediately in this case. While the filter 820a remains in an active position in the optical path, the non-active filter 820a' is parked in a position parallel to the optical path and thus requires almost no additional space, because the optical path already expands in this direction. Compared to the state of the art, this solution only indicates a virtually insignificant "thickening" of the optical path, whereas the state of the art requires lateral space for more than two optical paths, in some cases more than four optical paths. The illustrated solution can be varied manifold. For instance, two or more changers, e.g. 890c and 891c in FIG. 8c, can also be assembled on the same axis 803c, preferably so as to be movable independent from one another. Each of the changers can include at least one optical element, each small number, in particular one-digit number, is possible; in FIG. 8c, two optical elements are assembled for each changer: 820c and 820c' on the support 801c in the changer 890c, 860c and 860c' on the support 801c' in the changer 891c.

Figure 8A:
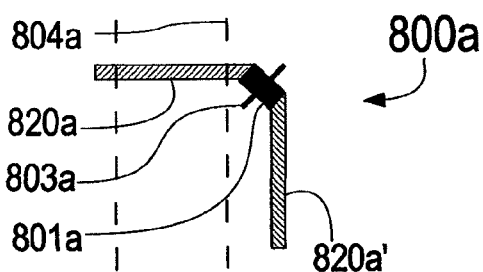
FIG. 8(a) shows simple changer.

A variation of the arrangement from FIG. 8a would be a changer comprising at least one beam splitter, which intersects the optical path at the angle α in the active position and which is positioned at least once substantially parallel to the optical path in response to the rotation of the changer. The axis of rotation of this changer would be located at the angle of α/2 relative to the optical path.

Figure 8B:
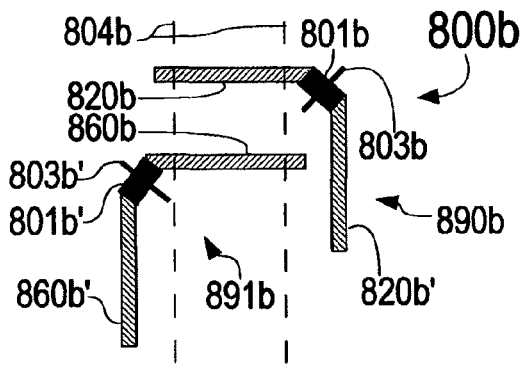
FIG. 8(b) shows double changer arrangement with spatially separated rotary devices on both sides of the optical path.

Changers 890b and 891b comprising the supports 801b and 801b' and the respective corresponding optical elements 820b and 820b' as well as 860b and 860b' can also be assembled separately from one another with different axes 803b and 803b', as in FIG. 8b. They may not only be assembled on both sides, as is the case here, but also on the same side of the optical path with different orientations. For instance, the changer 891b could be arranged with the support 801b' downwards (see also FIG. 13).

Figure 8E:
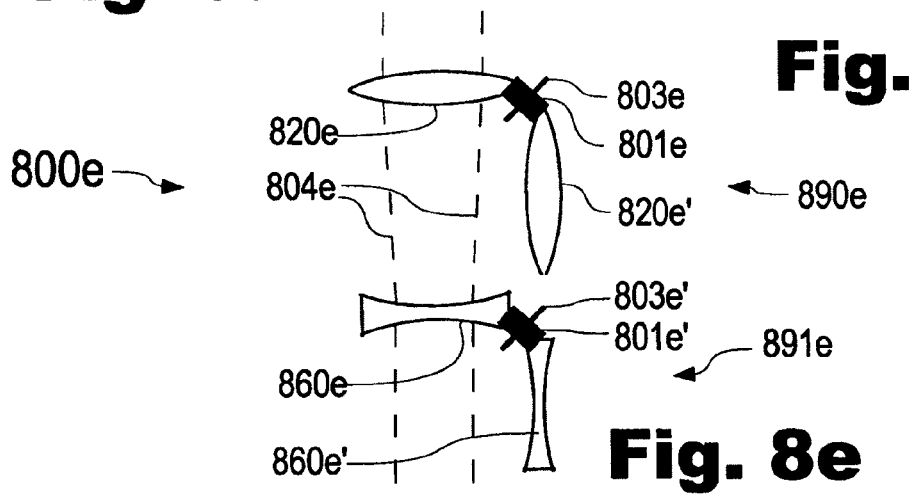
FIG. 8(e) shows double changer arrangement with spatially separated rotary devices on one side of the optical path with lenses
Figure 8C:
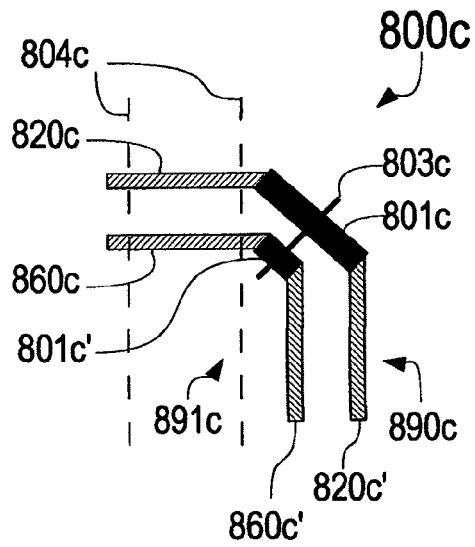
FIG. 8(c) shows double changer arrangement with an axis of rotation for an optical path (changer is preferably uncoupled)
Figure 8D:
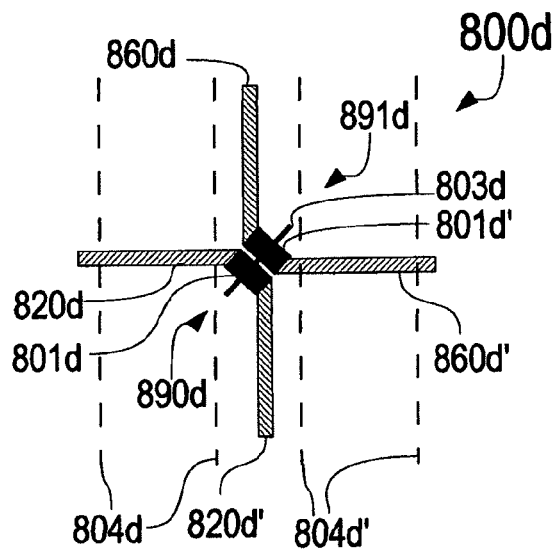
FIG. 8(d) shows double changer arrangement with an axis of rotation for a stereo optical path (changer is preferably coupled)

In the event that a changer is to be operated as in FIG. 8a in a stereo optical path, the solution from FIG. 8d can be used. The two changers 890d and 891d are supported on a common axis 803d and the optical elements could also be assembled on a common support, instead of on two different supports 801d and 801d', as is the case here. They would thus preferably, albeit not necessarily be coupled to one another in a stereo optical path 804d and 804d' and could not be moved independent from one another. However, in the case of two spatially connected optical paths 804d and 804d', which do not form a stereo optical path, the two changers would preferably, albeit not necessarily not be coupled to one another and could be moved independent from one another.

In the event that the optical elements in FIG. 8b are replaced with lenses and in the event that a changer is preferably, but not necessarily positioned in a changer further below in the optical path, and is then also preferably, but not necessarily rotated by 90°, a modified novel Galilei changer 800e is attained as in FIG. 8e. In this example, the partial changers 890e and 891e are arranged on the same side of the optical path, the axes 803e and 803e' are spaced apart from one another and parallel. The partial changer 890e encompasses lenses having a positive refractive power 820e and 820e' as optical elements, which are assembled on the support 801e; the partial changer 891e encompasses lenses having a negative refractive power 860e and 860e' as optical elements, which are assembled on the support 801e'. A Galilei changer is thus possible, which has the same amount of stages as the number of the lens pairs, each comprising a lens having a positive and negative refractive power. The arrangement thus only has the advantage of small torques as compared to the state of the art. The number of stages remains in the small single-digit range, as in the case of the classic Galilei changer, in the case of which the lenses are arranged on the outside of a cylindrical roller.

Figure 9A:
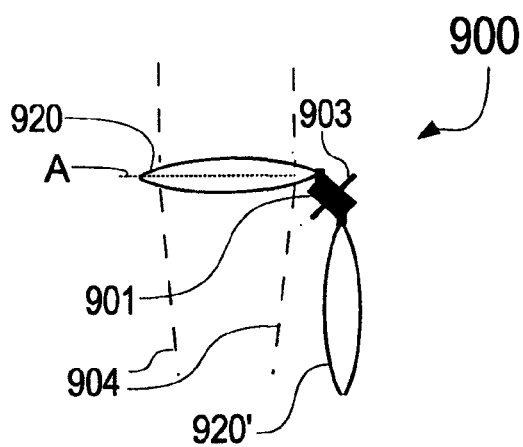
FIG. 9(a) shows lens 1 in the upper position on the support and FIG. 9(b) shows lens 2 in the lower position on the support.
Figure 9B:
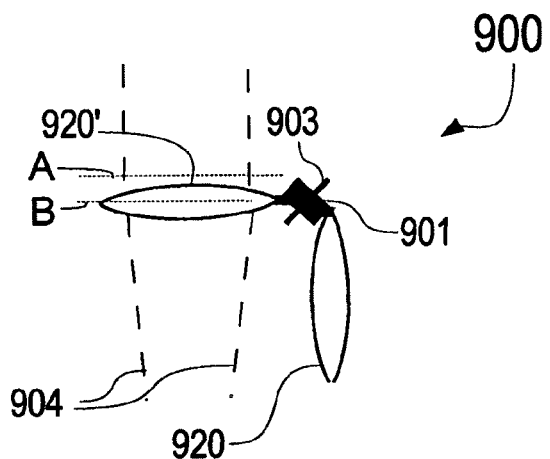

However, in the event that the lenses are arranged on the support in such a manner that they are introduced into the optical path at different locations, which are defined, however, as it is shown in FIG. 9, the number of stages can be squared. In FIG. 9a, the lens 920 is located at the upper end of the support 901 in the optical path 904 at the location A, the lens 920' assembled on the lower end of the support 901 is located outside of the optical path 904. In the event that the changer 900 is rotated about the axis 903 by 180°, the lens 920' is located in the optical path 904 at the location B at a distance d (not shown explicitly) from the location A.

Figure 10:
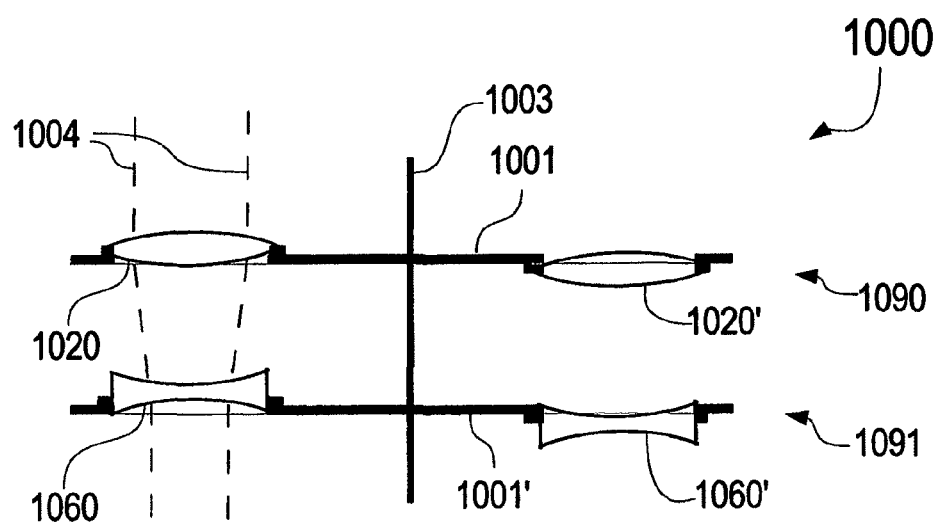
FIG. 10 shows a further (Galilei) changer with two movable rotating discs and arrangements of the optical elements (lenses) at different heights.

FIG. 10 shows a further alternative 1000 of the novel Galilei changer. It consists of two planar partial changers 1090 and 1091, which are embodied herein with discs 1001 and 1001' as support and which can be seen from the side in FIG. 10. Each of the partial changers encompasses at least two lenses. The partial changer 1090 encompasses the lenses 1020 and 1020', the partial changer 1091 encompasses the lenses 1060 and 1060', which are arranged at different heights with reference to the supports 1001 and 1001', respectively. The two partial changers are arranged on the axis 1003, wherein they can preferably be moved independent from one another, at least partially. The lenses 1020 and 1060 are located in the optical path 1004 in the active position, the lenses 1020' and 1060' are located outside of the optical path 1004 in the non-active position.

Figure 11:
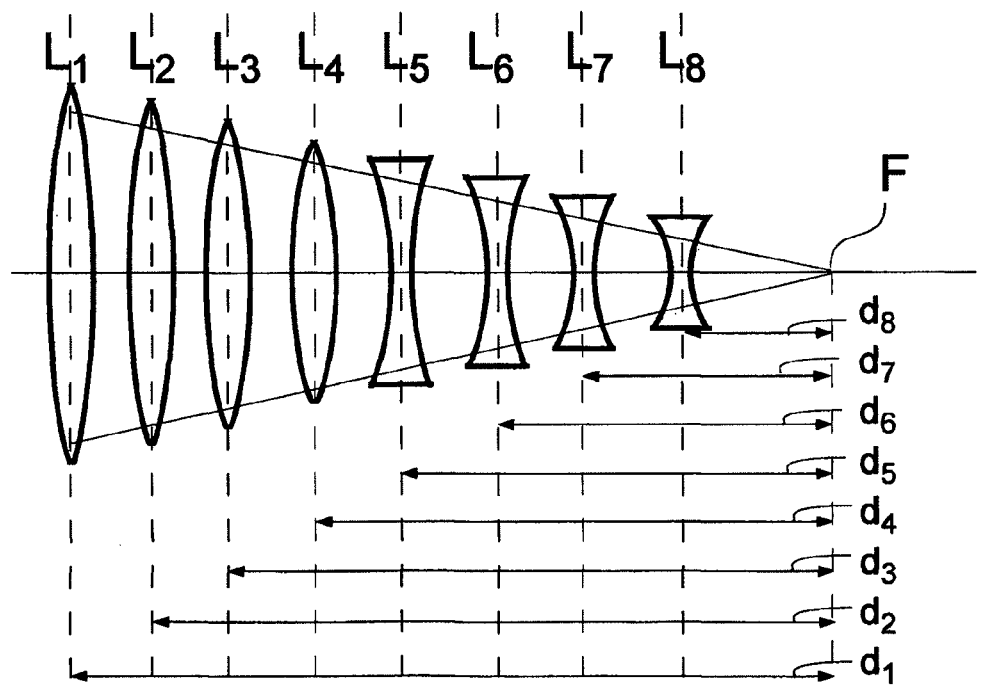
FIG. 11 shows an auxiliary drawing for arranging the lenses in the novel Galilei changer.

The mode of operation of the novel Galilei changer, e.g. according to FIGS. 8e and 9 or according to FIG. 10, can be understood by means of FIG. 11. F is the common focus of the lenses $L_1, L_2, L_3, L_4, L_5, L_6, L_7$ and $L_8$, which are in each case located at a distance $d_1=|f_1|$, $d_2=|f_2|$, $d_3=|f_3|$, $d_4=|f_4|$, $d_5=|f_5|$, $d_6=|f_6|$, $d_7=|f_7|$ and $d_8=|f_8|$ from F or on one side of F, respectively. $L_5, L_6, L_7$ and $L_8$ are thereby a virtual focus. Preliminarily, for the sake of simplicity, we will observe thin lenses. Depending on the requirements, the lenses, in particular the positive lenses, can have the same diameters. The size of the negative lenses can be adapted to the dimensions of the optical path. When combining any of these positive lenses with any of these negative lenses, $|f_i+f_j|=d_{ij}$ fulfills the condition for being afocal, wherein f is the focal length of the lens, i is the index for the first set of lenses, e.g. here for the positive lenses and j is the index for the second set of lenses, e.g. here for the negative lenses, and an afocal Galilei changer is at hand.

Commonly, the one partial changer will include positive lenses, the other one negative lenses. However, a partial changer can also include positive as well as negative lenses. The considerations as for FIG. 11 then apply individually for each partial quantity of the lenses of the same type (positive/negative) of a partial changer. However, the number of the magnification stages is halved in the case of this arrangement.

Both partial changers can also include locations, in particular one in each case, which are free from lenses, through which the optical path can expand. In the event that these locations are located in the optical path, it is not influenced and a magnification equal 1 is attained. However, the number of the possible magnification stages will thereby be considerably smaller, with the same number of optical elements, wherein the free locations also count as elements, e.g. 10 instead of 16 magnification stages with a total of eight optical elements, which are only lenses.

With the arrangement according to FIG. 10, it is possible to realize a 9-stage Galilei changer in each case with six lenses each (three lens pairs) for each partial changer, for example in a stereo optical path. In addition to the higher number of magnification stages (9 instead of 5 with 12 instead of 8 lenses), it is also considered to be a further advantage as compared to the classic Galilei changer that larger lens distances can be realized, which can suggest a higher optical quality with comparatively simple means, wherein the torques of the changer arrangement remain small.

Due to the fact that the lens offset along the optical path is oftentimes larger than the lens dimensions, the Galilei changer from FIG. 10 can be modified such that the supports 1001 and 1001' are not embodied as discs, but as direct "fir-like" attachment of the lenses on or around the axis 1003. One can even go a step further and each lens or lens pair (e.g. in the stereo optical path) can be pivoted into the optical path individually about the axis 1003 or it can also be inserted linearly, e.g., similar to the solutions in FIG. 3 or FIGS. 4a and b (for the illustrated stereo sensor or two spatially connected optical paths as well as for individual optical paths) or similar to the solutions in U.S. Pat. No. 4,600,976, DE 198 32 973, U.S. Pat. No. 3,255,666 and DE 197 02 967 for filters.

Several examples are now to be introduced.

A combination, e.g. according to FIG. 8e with FIG. 9 or according to FIG. 10 of three positive and three negative lenses is to provide magnification stages in even 1.2-steps. The nine magnification stages are specified in table 1, by listing the lenses, to which the respective magnification stage applies.

TABLE 1

Magnification stages changers comprising three positive and three negative lenses, 1.2-step

| $M(L_i, L_j)$ | $L_4$ | $L_5$ | $L_6$ |
|---|---|---|---|
| $L_1$ | 1.73 | 2.99 | 5.16 |
| $L_2$ | 1.44 | 2.49 | 4.30 |
| $L_3$ | 1.20 | 2.07 | 3.58 |

This results in a magnification changer with 4.3-fold magnification range $V=M_{max}/M_{min}$ with $M_{max}$ being the maximum magnification, $M_{min}$ being the minimum magnification, $M(L_i, L_j)$ being the magnification with the lenses $L_i$ and $L_j$. In the event that two locations, which are free from lenses, are added, this results in a number of ten magnification stages and a 5.2-fold magnification range. When choosing the focal length f=−5 mm for the smallest negative lens, the result is a total length of the changer of 21 mm (condition: thin lenses). The distances of the lenses along the optical path are $d_{12}$=4.3 mm, $d_{23}$=3.6 mm, $d_{34}$=3.0 mm, $d_{45}$=6.3 mm and $d_{56}$=3.6 mm and further focal lengths $f_1$=25.8 mm, $f_2$=21.5 mm, $f_3$=17.9 mm, $f_4$=−14.9 mm, $f_5$=−8.6 mm and $f_6$=−5.0 mm. This applies to the case that the small steps in the magnification are caused by the change of the positive lenses. The case that the small steps in the magnification are caused by the change of the negative lenses, is possible and the person of skill in the art deduces this with ease.

When minimally increasing the step length from 1.2 to 1.25, the following magnification stages result:

TABLE 2

Magnification stages changer comprising three
positive and three negative lenses, 1.25-step

| $M(L_i, L_j)$ | $L_4$ | $L_5$ | $L_6$ |
|---|---|---|---|
| $L_1$ | 1.95 | 3.81 | 7.45 |
| $L_2$ | 1.56 | 3.05 | 5.96 |
| $L_3$ | 1.25 | 2.44 | 4.77 | and a magnification changer with a 6-fold magnification range. When adding two more locations, which are free from lenses, this results in a number of ten magnification stages and a 7.5-fold magnification range. When choosing the focal length f=−5 mm for the smallest negative lens, this results in a total length of the changer of 31 mm (condition: thin lenses). The distances of the optical path are $d_{12}$=7.5 mm, $d_{23}$=6.0 mm, $d_{34}$=4.8 mm, $d_{45}$=9.3 mm and $d_{56}$=4.8 mm.

A combination of four positive and four negative lenses is to provide magnification stages in even 1.15-steps. The sixteen magnification stages are illustrated in table 3.

TABLE 3

Magnification stages changers comprising four
positive and four negative lenses, 1.15-step

| $M(L_i, L_j)$ | $L_5$ | $L_6$ | $L_7$ | $L_8$ |
|---|---|---|---|---|
| $L_1$ | 1.75 | 3.06 | 5.35 | 9.36 |
| $L_2$ | 1.52 | 2.66 | 4.65 | 8.14 |
| $L_3$ | 1.32 | 2.31 | 4.05 | 7.08 |
| $L_4$ | 1.15 | 2.01 | 3.52 | 6.15 |

This results in a magnification changer with an 8.1-fold magnification range. When adding two more locations, which are free from lenses, this results in a number of seventeen magnification stages and a 9.4-fold magnification range. When choosing the focal length f=−2 mm for the smallest negative lens, this results in a total length of the changer of 16.7 mm (condition: thin lenses). The distances of the lenses along the optical path are $d_{12}$=2.4 mm, $d_{23}$=2.1 mm, $d_{34}$=1.9 mm, $d_{45}$=1.6 mm, $d_{56}$=4.6 mm, $d_{67}$=2.6 mm and $d_{78}$=1.5 mm.

Figure 12:
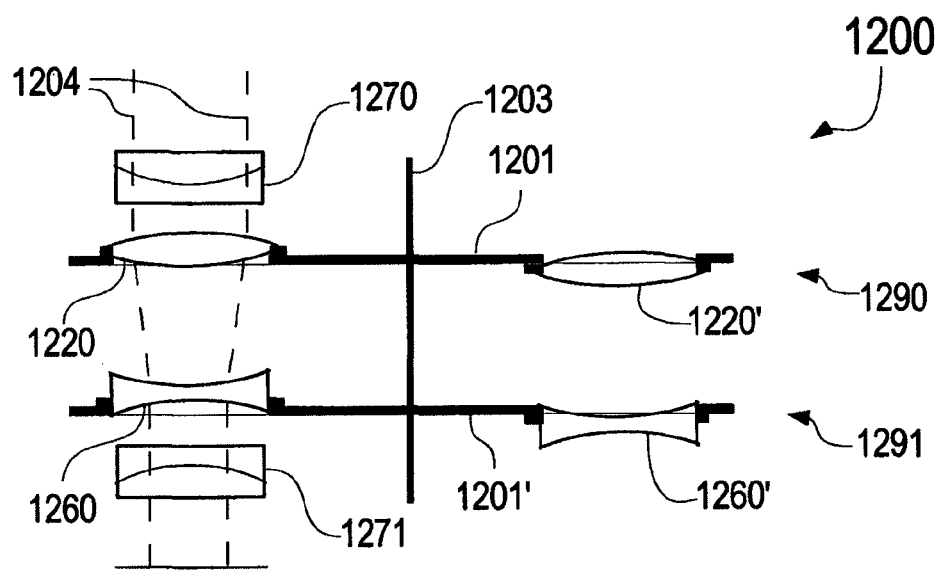
FIG. 12 shows a combination of a planar Galilei changer with zoom having lenses of a variable refractive power.
Figure 13:
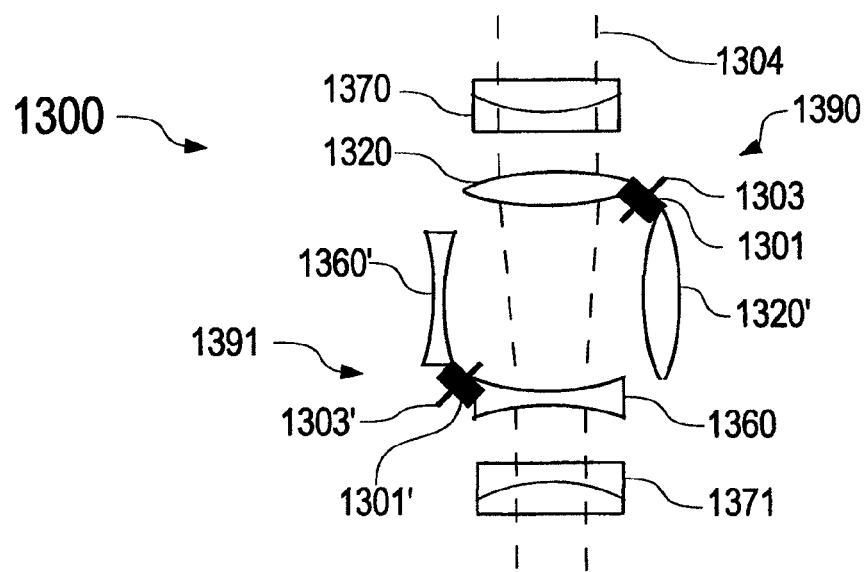
FIG. 13 shows a combination of a non-planar Galilei changer with zoom having lenses of a variable refractive power.

However, when arranging the lenses in an equidistant or virtually equidistant manner, the magnification stages appear at distances, which are quite different, which suggests that some stages are not completely of full value, because they are partially too small and, on the other hand, because they could, in turn, seem to be too large under the aspects of FIGS. 12 and 13 (required small zoom range due to optical aberrations).

To simplify matters, we observed thin lenses. The results do not change much when using actual lenses, in particular when using achromatic lenses and apochromatic lenses or other combined lenses, the at least partial use of which is necessary due to the required correction of optical aberrations.

However, if the lenses of a partial changer are to be inserted into the optical path more closely "to one another", e.g. due to a small imbalance, an arrangement will be used, which leaves the main planes as described (at the location of the thin lenses), but which allows the lenses with their space in the optical beam to move closer together. This can take place, e.g. in that arrangements are used, which follow telefocus or retrofocus object lenses, because the main planes can here indeed be located far away from the lenses themselves, or in that such arrangements are combined with cemented elements, e.g.

A changer can also be realized as a Kepler changer. In this case, both partial changers include positive lenses and an intermediate image is created between the partial changers. The condition for being afocal also applies here with $|f_i+f_j|=d_{ij}$. However, a use of place holders for lenses is not possible without an image erection, which can be connected.

The presented Galilei changers could be controlled in different modes. In a rapid mode, the partial changers could be controlled independent from one another in less than one rotation into the desired end position, e.g. a certain magnification value or minimum/maximum magnification. Some of the magnification stages can be skipped with this. However, in the slow mode, the changer comprising the lenses for the large magnification step would carry out another step as a function of the changer comprising the lenses for the small magnification stage, only after the rotation thereof has been completed, and would thus pass through all stages consecutively without jumps.

In view of the lenses having a variable refractive power, which have only been available for a few years, it is now possible to use them for filling the magnification areas between the magnification stages, which are offered by the Galilei changer. The changes in the refractive power, which are necessary for this, are relatively small and, when controlling it expertly, the arrangement is virtually free from optical aberrations, which have otherwise prevented the use of the lenses having a variable refractive power in the case of optical zooms. The realization of such changers, which must be controlled, but which offer each magnification within the entire magnification range, is presented in FIGS. 12 and 13.

In FIG. 12, the arrangement from FIG. 10 is expanded by two lenses having a variable refractive power.

The arrangement 1200 shows a further alternative of the novel Galilei changer. It consists of two planar partial changers 1290 and 1291, which are embodied herein with discs 1201 and 1201' as supports and which can be seen from the side in FIG. 12. Each of the partial changers encompasses at least two lenses, the partial changer 1290 encompasses the lenses having a positive refractive power 1220 and 1220', the partial changer 1291 encompasses the lenses having a negative refractive power 1260 and 1260', which are arranged at different heights with reference to the supports 1201 and 1201', respectively. The two partial changers are arranged on the axis 1203, wherein they can preferably be moved independent from one another, at least partially. The lenses 1220 and 1260 are located in the optical path 1204 in the active position, the lenses 1220' and 1260' are located outside of the optical path 1204 in the non-active position. Two lenses having a variable refractive power, one lens having a variable refractive power 1270 above the changer 1290 and one lens having a variable refractive power 1271 below the changer 1291, are furthermore located in the optical path 1204. The lenses having a variable refractive power form an optical zoom of a small magnification range, which, however, should reasonably be at least almost equal to and, better yet, larger than that of each of the magnification steps of the changer.

In FIG. 13, a similar arrangement as from FIG. 8e and possibly FIG. 9 is expanded with 1300 by two lenses having a variable refractive power. However, the partial changers 1390 and 1391 are arranged here on the opposite sides of the optical path, the axes 1303 and 1303' are spaced apart from one another and parallel. The partial changer 1390 encompasses at least two lenses having a positive refractive power 1320 and 1320' as optical elements, which are assembled on the support 1301; the partial changer 1391 encompasses at least two lenses having a negative refractive power 1360 and 1360' as optical elements, which are assembled on the support

1301'. The lenses 1320 and 1360 are located in the optical path 1304 in the active position, the lenses 1320' and 1360' are located outside of the optical path 1304 in the non-active position. Two lenses having a variable refractive power, one lens having a variable refractive power 1370 above the changer 1390 and one lens having a variable refractive power 1371 below the changer 1391, are furthermore located in the optical path 1204. The lenses having a variable refractive power form an optical zoom of a small magnification range, which, however, should reasonably be at least almost equal to and, better yet, larger than each of the magnification steps of the changer. It results from this that the magnification range of the Galilei changer increases by the size of a magnification step. In the example according to table 1, the magnification range is then already 5.2 without the place holders, even 6.2 instead of 4.3 with the place holders. In the example according to table 2, the magnification range is accordingly already 7.5 without the place holders, even 9.3 instead of 6.0 with the place holders.

The lenses having a variable refractive power are preferably fixedly arranged in the optical path and cannot be moved with the changer. On principle, they can also be located between the lenses of the changers, but they are preferably arranged outside of the changers in a much simpler manner and also preferably, but not absolutely necessarily: one lens having a variable refractive power upstream of the Galilei changer and one lens having a variable refractive power downstream from the Galilei changer. However, in response to small magnification steps of the Galilei changer, they can also both be arranged on one side of the changer without any problems. However, more lenses having a variable refractive power can also be arranged for the purpose of further correction of the optical aberrations.

A lens having a variable refractive power can thereby also take over the autofocus function or can take over some of it.

The at least two lenses having a variable refractive power are preferably controlled in opposite direction, that is, when the refractive power of one lens having a variable refractive power is increased, the other one is decreased. This is one way to correct the optical aberrations or the lenses having a variable refractive power. Another way is to replace the individual lenses having a variable refractive power with double lenses or with two lenses having a variable refractive power. These pairs are also preferably controlled in the opposite direction. In so doing, it is attained that the optical aberrations of a pair, which is controlled in opposite direction, are not only smaller than the sum of the optical aberrations of the individual lenses having a variable refractive power, but that they are smaller than the optical aberrations of the individual lenses having a variable refractive power.

One of the partial changers, preferably the one, which includes the lenses for the small steps in response to the magnification change, in the examples according to tables 1 to 3 these are the lenses having a positive refractive power, could furthermore be replaced with a stationary lens, here having a positive refractive power, comprising at least one lens having a variable refractive power, with a loss of quality, which is not too large.

The lenses having a variable refractive power can thereby be, e.g., lenses according to the electrowetting principle comprising at least two liquids by Varioptic or Philips or the lenses by Holochip, Optotune or RheVision. However, other lenses having a variable refractive power are not to be excluded by these examples.

The rotary device, as it is presented in FIGS. 7c), 8a), 9a) and b), e.g., acts only as a magnification partial changer in FIGS. 13) and 8e), but could be further developed into independent magnification changers.

Figure 14:
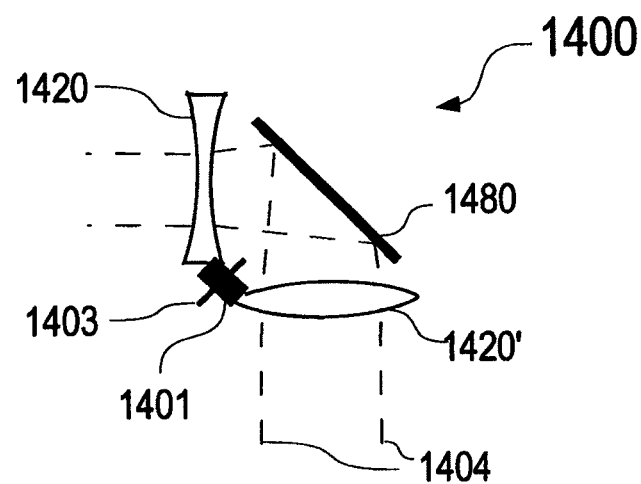
FIG. 14 shows a compact Galilei changer with folding and double use of the lens pairs.

For this purpose, the lens holder 1401 in FIG. 14, which can be rotated about the axis 1403, is equipped with lens pairs, which preferably fulfill the condition $|f_i+f_j|=d_{ij}$ for being afocal, wherein $d_{ij}$ is the distance of the two lenses, $f_i$ is the focal length of the lens i and $f_j$ is the focal length of the lens j. In the case of the Kepler arrangement, both of the lenses of a lens pair have positive focal lengths and in the case of the Galilei arrangement, the one lens of the lens pair has a positive focal length and the other lens of the lens pair has a negative focal length. In the case of the Galilei changer (the common and preferred case), the arrangement is equipped with the pair negative lens 1420 and positive lens 1420' and possibly with further (few) lens pairs in each case of a negative lens and a positive lens, wherein two place holders are to also be a lens pair. The two place holders provide for the magnification 1. For instance, the arrangement 1400 could consist of two lenses 1420 and 1420' and two place holders or the place holders could also be replaced with a second lens pair. The lens pairs are pivoted into the optical path 1404 by rotation about the axis 1403 and are pivoted out of it. In addition, the arrangement 1400 also obtains a preferred stationary deflection device 1480, which is embodied as a simple mirror in FIG. 14. However, it could also be a different deflection device, e.g. a deflection prism, an arrangement consisting of a plurality of mirrors, a prism comprising a multiple deflection, in particular a pentaprism or other ones. The deflection devices are preferably stationary, but can indeed be embodied so as to be movable. The optical path 1404 can be folded virtually arbitrarily between the lenses 1420 and 1420', e.g. so as to save space. However, a deflection device is sometimes also sensible outside of the lenses and may even be absolutely necessary, e.g., so as to be able to observe the image, which has been transmitted by the arrangement, from the correct side and not inverted, or so as to be able to direct the optical path into the correct direction.

With the lens 1420 on the top left and with the lens 1420' on the bottom right, the arrangement 1400 provides the magnification a in FIG. 14. By rotation by 180°, the lens 1420' is located on the top left and the lens 1420 is on the bottom right and the magnification is 1/a. In the event that the place holders are brought into the optical path by means of the rotation by 90°, e.g., the magnification is 1. In the event that another lens pair is brought into the optical path instead of the place holders, the magnification is b and in response to a further rotation by 180°, the magnification is 1/b. It can be seen that a Galilei changer can be realized with this arrangement in a highly space-saving manner, which provides three magnification stages (a, 1, 1/a) with two lenses and two place holders, and which provides four magnification stages (a, 1/a, b, 1/b) with four lenses). In addition to saving space, this changer provides further advantages. For instance, the weight distribution in the changer is more favorable than in the changers according to the state of the art. It is thus quicker and requires less energy, the drive can also be designed to be smaller. However, it must be noted that the mirror inverted image must be corrected, if necessary.

Figure 15:
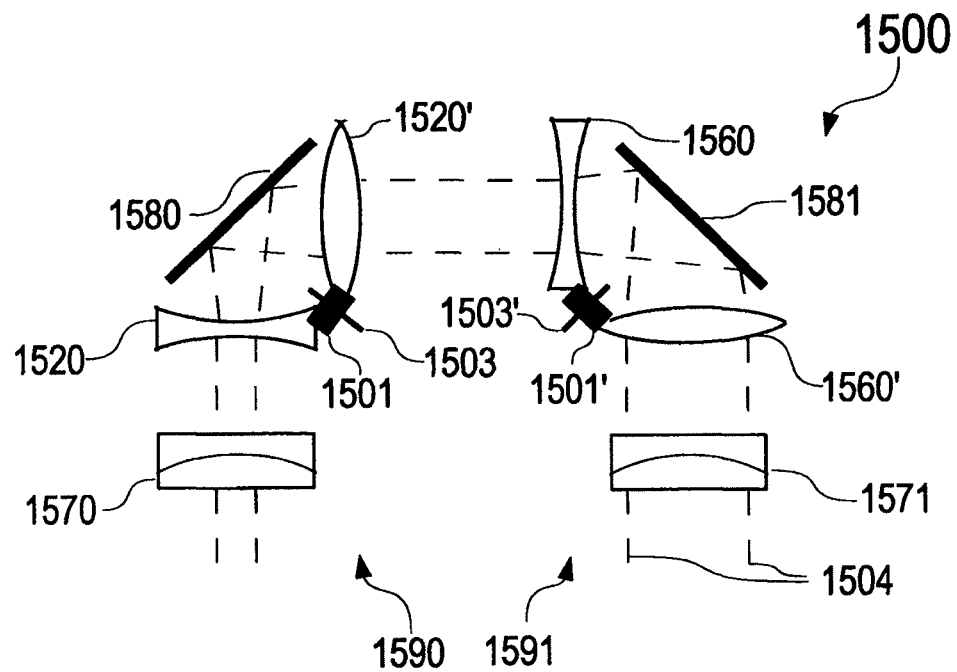
FIG. 15 shows a double cascade from the Galilei changer according to FIG. 14 comprising an analog zoom with lenses having a variable refractive power.

In the event that the three or four magnification stages of an arrangement according to FIG. 14 are not sufficient in a use, the use of the arrangement from FIG. 15 can be considered. Here, two arrangements according to FIG. 14 are brought consecutively into the optical path (cascaded). Optionally, the lenses having a variable refractive power 1570 and 1571 can also be used as continuous zoom, similar as in FIGS. 12 and 13. Attached to the frame 1501, the lenses 1520 and 1520' together with the mirror 1580 form the first Galilei (full)

changer 1590, which provides three magnification stages a, 1 and 1/a, e.g., by rotation about the axis 1503. These three magnification stages are combined with the three magnification stages b, 1 and 1/b of the changer 1591, formed by the lenses 1560 and 1560', arranged on the frame 1501', thus resulting in nine magnification stages ab, a, a/b, b, 1, 1/b, b/a, 1/a and 1/ab. The magnifications between the magnification stages can be covered by the zoom comprising lenses having a variable refractive power, which is to have a dynamic c. With a=b=c=1.3, a quasi continuous zoom with a dynamic of $1.3^9=10.6$ is then attained with an excellent optical quality and without much development work. It must also be noted that both changers 1590 and 1591 encompass two place holders in each case.

It can be seen that nine instead of four or five magnification stages, as in the state of the art, can be attained by means of the cascading with four lenses. For instance, it would have even been possible to attain 27 magnification stages with six lenses and three stages of a cascade. In a Galilei changer according to the state of the art, the same six lenses would only provide six or seven magnification stages. Seven magnification stages can thereby be realized only in the case of two additional place holders and with an indisputably large changer. The enormous advantages of the cascading are evident when requiring many magnification stages.

Figure 16:
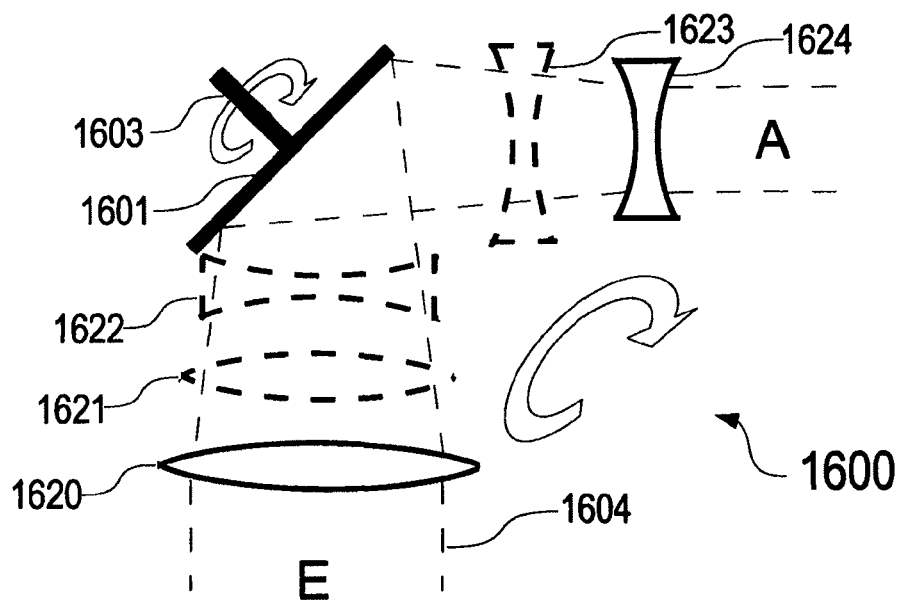
FIG. 16 shows a magnification changer according to the principle of FIG. 11 with twice the number of magnification stages, 90° arrangement.

On the one hand, the advantage of this arrangement is created by means of the cascading, on the other hand by means of the double use of the lens pairs, in that once the first lens of the lens pair is permeated by light of the optical path first and then the second lens of the lens pair, and in that the second lens of the lens pair is permeated by light of the optical path first and then the first lens of the lens pair. This second advantage is already known from the state of the art with the standard Galilei changer; it can also be used for the other changers according to the invention. In the event that the lens pairs of the arrangements from FIG. 8e), 10, 11, 12 and 13 are also used in both directions, the number of magnification stages doubles. This can take place in the optical path by means of a simple rotation of the arrangement according to FIG. 8e), 10, 11, 12 or 13 by 180°, e.g. Due to the sizeable expansion of the arrangement, the process of rotation can turn out to be slow, mechanically extensive and space-intensive. A direct borrowing from the state of the art is thus not very elegant. Sometimes, it is thus recommended to first fold the arrangement. A first proposal is illustrated in FIG. 16. The arrangement consists of lenses 1620, 1621, 1622, 1623 and 1624, two of which, 1629 and 1624, are pivoted here into the optical path and are thus active. It should be emphasized once again that one lens from each partial changer is in each case pivoted in for a magnification stage. Here, the first partial changer is formed by the lenses 1620 and 1621 having a positive refractive power, the second partial changer is formed by lenses 1622, 1623 and 1624 having a negative refractive power. In the event that all of the lenses can be removed from the optical path, e.g. in that they are removed individually or by using place holders, the arrangement has 2×3+1=7 magnification stages according to the current version, thus without using the lens pairs twice. The number of the magnification stages is thus the product from the numbers of the lenses in the partial changers plus the magnification stage 1 for no lens in the optical path. In the event that not all of the lenses of the partial changers can be removed from the optical path, the number of magnification stages would thus be 6. If now allowing that the lens pairs are used in both directions, the number of magnification stages in the arrangement according to FIG. 16 is now 12 or 13. This takes place in that the arrangement 1600 is rotated about the axis 1603 by 180°. The lens 1620, which was first positioned at the entrance E, reaches the exit A by means of rotation. Vice versa: the lens 1624, which was first positioned at the exit A, reaches the exit E by means of rotation. The mirror 1601, which ensures the folding of the arrangement, can thereby be moved along with the remaining arrangement or can also remain stationary. The mirror was illustrated as a movable mirror in FIG. 16. The mirror 1601 could have also been replaced with a different deflection device. In the event that the magnification of the arrangement with the lens 1620 at the entrance E is a, the magnification with the lens 1620 at the exit A is 1/a. The same also applies to all other lens combinations. The number of magnification stages has thus doubled.

Figure 17:
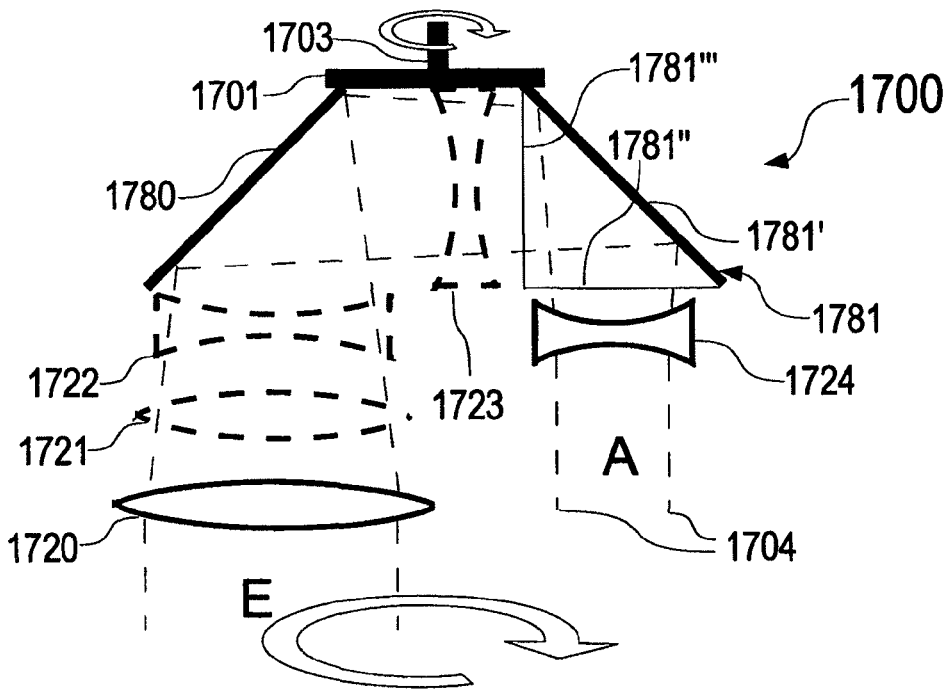
FIG. 17 shows a magnification changer according to the principle of FIG. 11 with twice the number of magnification stages, 180° arrangement.

The arrangement from FIG. 17 could be used in the event that the arrangement from FIG. 16 is still too voluminous or in the event that the required torques for moving the arrangement are still too high. Due to the smaller radius on which the lenses move, the torques become smaller. Likewise, the rotative volume, which is required by the arrangement, becomes smaller. The lenses 1720, 1721, 1722, 1723, and 1724 are used in the arrangement 1700. The lenses 1720 and 1724 are actively pivoted in in FIG. 17. The optical path 1704 expands from the entrance E through the lenses or their non-occupied positions 1720, 1721 and 1722, respectively, is deflected by means of the passive reflector 1780, passes the position for the lens 1723, is once again deflected by means of the deflection prism 1781 with the reflection surface 1781' and the transmission surfaces 1781' and 1781", passes the lens 1724 and leaves the arrangement at the exit A with a magnification of b. In the event that the entire arrangement is now rotated by 180° about the axis 1703, the lens 1720 reaches the exit A, the lens 1724 reaches the entrance E and the arrangement then has the magnification 1/b. The deflection prism can be used, e.g., to shorten the optical path between the lenses, as is the case here, so that the equidistance of the magnification stages is preserved. By using different deflection elements, they must also be moved in response to the rotation of the arrangement 1700, unlike in the case of the arrangement 1600.

The arrangements from FIGS. 16 and 17 should only be considered to be examples. The invention claims every possibility for folding and for the interchangeability of the entrance with the exit of the arrangement.

It should also be clarified that a changer according to FIG. 8A in most cases signifies progress only when the distance of the optical element 820' or of other elements in the non-active position outside of the optical path from the optical path is smaller than the diameter of the optical path itself. In the alternative, one or a plurality of changer wheels according to the state of the art could otherwise be assembled consecutively. Depending on the number of equipped optical elements, they would have a diameter of at least two diameters of the optical path. More preferably, this maximum distance is less than 75% of the optical path diameter, optimally less than 50% of the optical path diameter.

It should also be noted that the analog zoom with lenses having a variable refractive power, as in FIGS. 12, 13 and 15, could be replaced with a digital zoom, wherein the quality loss would be relatively small. Both zooms could also be used together, the magnification dynamic could thus be multiplied.

It goes without saying that the afocal magnification changers presented in this application could be converted into focal changers by means of an additional refractive power.

It must be noted that the lenses used in the examples can generally be replaced with other optical elements.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed:

1. A changer comprising:
an axis of rotation for at least one optical element for at least one optical path comprising an optical axis,
wherein the changer inserts the at least one optical element into the at least one optical path by means of a rotary motion or removes it from this optical path,
wherein the at least one optical path is one of at least two spatially connected optical paths and that the axis of rotation of the changer is located between two parallel lines,
wherein the parallel lines run in the plane through the interfaces of the optical axes of the optical paths with one plane, which intersects the optical axes under the same angles and is thereby perpendicular to the plane, which is spanned by the optical axes,
wherein the parallel lines are perpendicular to the connecting line between the two interfaces of the optical axes of the optical paths with the one plane, which intersects the optical axes under the same angles,
wherein the at least one optical element is a lens, a mirror, a filter, a DOE, an optical grating, a beam splitter or a diaphragm,
wherein the filter is suitable for fluorescence excitation or for fluorescence detection, wherein the angle between the optical axis and this one plane which is intersected by the optical axis is substantially 90° or 45°,
wherein the at least one optical path is one of at least two spatially connected optical paths and the at least one optical element, if rotated by 360° around the changer's axis of rotation, would cross also the second of the at least two spatially connected optical paths,
wherein the at least two spatially connected optical paths are two different parts of the same optical path, wherein these parts are separated by a beam splitter or a mirror,
wherein the axis of rotation and the optical axis of the beam path are at an angle and the distance of the optical elements, which are outside the optical beam path, is smaller than the diameter of the beam path, preferably smaller than 75% of the diameter of the beam path, further preferably smaller than 50% of the diameter of the beam path,
wherein the angle between its axis of rotation and the optical axis of the beam path is substantially 45°, and
wherein the optical elements are lenses, the changer has two sets of the lenses arranged in the beam path in a consecutive way, which satisfy the condition $|f_i+f_j|=d_{ij}$, wherein d is the distance of the lenses inserted into the beam path, f is the focal length of the lens, i is the index for the first set of lenses, and j is the index for the second set of lenses.

2. An optical device containing the changer according to claim 1, wherein the optical device also contains at least one optical element of variable optical power.

3. The optical device according to claim 2, wherein in the optical device at least two lenses of variable optical power are controlled in opposite direction, so if one the optical power of the one lens is enhanced, the optical power of the other lens is decreased and vice versa.

4. The optical device according to claim 3, wherein the at least two lenses of variable optical power build up an optical zoom.

5. The optical device according to claim 4, wherein the zoom range at least covers the gap between the magnification stages of the changer.

6. The changer according to claim 1, wherein the changer comprises two partial changers arranged in the beam path in a consecutive way.

7. The changer according to claim 1, wherein a lens pair provides for two magnification stages.

8. A method to tune a changer for magnification comprising two partial changers, the method comprising:
holding a first partial changer in a position with a first optical element in the optical path, while the second partial changer assumes all of its possible positions consecutively in each case with a different optical element in the optical path; and
subsequently, the first partial changer assumes its next position with a next optical element in the optical path and the second partial changer then again assumes its possible positions consecutively,
wherein the two partial changers are arranged in the beam path in a consecutive way.

9. A method to tune an optical device comprising a changer for magnification and an optical zoom, the method comprising:
holding both partial changers, the first and the second, in a position in each case with an optical element in the optical path, while the zoom preferably passes its area in the periphery of an intermediate area between the individual magnifications of the second partial changer;
subsequently, the first partial changer maintains its position, with the first optical element in the optical path and the second partial changer assumes its next position with a next optical element in the optical path;
the zoom is set back and finally moves through its area;
the process repeated until the second partial changer has assumed all of its possible positions consecutively; and
the first partial changer assumes its next position and the tuning of the second partial changer and of the zoom starts from the beginning,
wherein the changer comprises:
an axis of rotation for at least one optical element for at least one optical path comprising an optical axis,
wherein the changer inserts the at least one optical element into the at least one optical path by means of a rotary motion or removes it from this optical path,
wherein the at least one optical path is one of at least two spatially connected optical paths and that the axis of rotation of the changer is located between two parallel lines,
wherein the parallel lines run in the plane through the interfaces of the optical axes of the optical paths with one plane, which intersects the optical axes under the same angles and is thereby perpendicular to the plane, which is spanned by the optical axes,
wherein the parallel lines are perpendicular to the connecting line between the two interfaces of the optical axes of the optical paths with the one plane, which intersects the optical axes under the same angles,
wherein the at least one optical element is a lens, a mirror, a filter, a DOE, an optical grating, a beam splitter or a diaphragm,
wherein the filter is suitable for fluorescence excitation or for fluorescence detection, wherein the angle between the optical axis and this one plane which is intersected by the optical axis is substantially 90° or 45°,
wherein the at least one optical path is one of at least two spatially connected optical paths and the at least one optical element, if rotated by 360° around the changer's axis of rotation, would cross also the second of the at least two spatially connected optical paths, wherein the at least two spatially connected optical paths are two different parts of the same optical path, wherein these parts are separated by a beam splitter or a mirror, wherein the axis of rotation and the optical axis of the beam path are at an angle and the distance of the optical elements, which are outside the optical beam path, is smaller than the diameter of the beam path, preferably smaller than 75% of the diameter of the beam path, further preferably smaller than 50% of the diameter of the beam path, wherein the angle between its axis of rotation and the optical axis of the beam path is substantially 45°, wherein the optical elements are lenses, the changer has two sets of the lenses arranged in the beam path in a consecutive way, which satisfy the condition $|f_i+f_j|=d_{ij}$, wherein d is the distance of the lenses inserted into the beam path, f is the focal length of the lens, i is the index for the first set of lenses, and j is the index for the second set of lenses, and wherein the changer comprises two partial changers arranged in the beam path in a consecutive way.

10. A changer for magnification comprising:
an axis of rotation; and
at least two optical elements,
wherein each optical element encompasses optical power,
wherein optical elements can be pivoted into an optical beam path having an optical axis, and
wherein the optical axis of the beam path at the spot where the optical elements can be pivoted into the beam path and the axis of rotation of the changer are at an angle different from 0° and 90°.

11. An optical arrangement comprising 2 or 3 changers according to claim 10, wherein the 2 or 3 changers are arranged in the beam path in a consecutive way.

12. An optical arrangement comprising 1, 2, or 3 changers according to claim 10 and a zoom with a range that at least covers the gap between the magnification stages of the optical arrangement.

13. The changer according to claim 10, wherein the angle is substantially 45°.

* * * * *